(12) United States Patent
Mazursky et al.

(10) Patent No.: US 12,440,592 B2
(45) Date of Patent: Oct. 14, 2025

(54) CONTINUOUS ELEMENT DECONTAMINATION AND STERILIZATION SYSTEM

(71) Applicants: Hernan Mazursky, San Diego, CA (US); Alexis Mazursky, San Diego, CA (US); Luis Adolfo Mazursky, San Diego, CA (US)

(72) Inventors: Hernan Mazursky, San Diego, CA (US); Alexis Mazursky, San Diego, CA (US); Luis Adolfo Mazursky, San Diego, CA (US)

( * ) Notice: Subject to any disclaimer, the term of this patent is extended or adjusted under 35 U.S.C. 154(b) by 1021 days.

(21) Appl. No.: 17/515,388

(22) Filed: Oct. 29, 2021

(65) Prior Publication Data

US 2022/0133933 A1 May 5, 2022

Related U.S. Application Data

(60) Provisional application No. 63/107,366, filed on Oct. 29, 2020.

(51) Int. Cl.
*A61L 2/26* (2006.01)
*A61L 2/07* (2006.01)
*A61L 2/24* (2006.01)

(52) U.S. Cl.
CPC .................. *A61L 2/26* (2013.01); *A61L 2/07* (2013.01); *A61L 2/24* (2013.01);
(Continued)

(58) Field of Classification Search
CPC ..... A61L 2/26; A61L 2/07; A61L 2/24; A61L 2202/122; A61L 2202/14; A61L 2202/17; A61L 2202/24
See application file for complete search history.

(56) References Cited

U.S. PATENT DOCUMENTS 3,368,865 A 2/1968 Schuck
4,346,524 A * 8/1982 Wochnowski .......... F26B 25/22
131/303
(Continued)

FOREIGN PATENT DOCUMENTS

CH 227794 A 7/1943
EP 0138688 A2 4/1985
(Continued)

*Primary Examiner* — Regina M Yoo

(57) ABSTRACT

A continuous element decontamination and sterilization system has a set of transition chambers and operation chambers, a set of ports, a conveyor system, and a container. The sterilization system uses the chambers to form a modular system where each of the operation chambers is sandwiched between a preceding transition chamber and a subsequent transition chamber. The transition chambers serve as preprocessing or post processing devices that condition the container before entering an operation chamber. In this way, the conditions within the operation chamber do not fluctuate when the container is moved into it by the conveyor system. The conveyor system moves the container through the transition chambers and the operation chambers and enables a user to reload the container to be passed through the chambers for subsequent sterilization operations. The ports are integrated into the chambers so fluids and cleaning agents can be pumped into and extracted from the chambers.

23 Claims, 27 Drawing Sheets

(52) U.S. Cl.
CPC ..... *A61L 2202/122* (2013.01); *A61L 2202/14* (2013.01); *A61L 2202/17* (2013.01)

(56) References Cited

U.S. PATENT DOCUMENTS

| | | | |
|---|---|---|---|
| 4,707,334 A | 11/1987 | Gerhard | |
| 6,334,472 B1* | 1/2002 | Lemke | B65B 55/025 |
| | | | 141/90 |
| 6,436,343 B1* | 8/2002 | Bechini | A61L 2/208 |
| | | | 53/425 |
| 6,872,918 B2 | 3/2005 | Toll | |
| 8,318,104 B2* | 11/2012 | Lewis | A61L 2/07 |
| | | | 261/DIG. 65 |
| 2005/0123435 A1* | 6/2005 | Cutler | A23L 3/001 |
| | | | 422/1 |
| 2005/0276722 A1* | 12/2005 | Hilton | A61L 2/18 |
| | | | 422/28 |
| 2007/0253861 A1* | 11/2007 | Naka | A61L 2/208 |
| | | | 422/186 |
| 2009/0134338 A1* | 5/2009 | Eguchi | B65B 55/027 |
| | | | 250/492.3 |
| 2010/0043915 A1* | 2/2010 | Sangi | A61L 2/208 |
| | | | 141/11 |
| 2011/0020174 A1* | 1/2011 | Rauschnabel | A61L 2/087 |
| | | | 250/453.11 |
| 2011/0283661 A1 | 11/2011 | Miller | |
| 2013/0243560 A1* | 9/2013 | Kimrey, Jr. | H05B 6/68 |
| | | | 414/805 |
| 2014/0301895 A1 | 10/2014 | Opie et al. | |
| 2018/0339797 A1 | 11/2018 | Altmann et al. | |
| 2019/0124732 A1* | 4/2019 | Kimrey, Jr. | A23L 3/01 |
| 2019/0192711 A1* | 6/2019 | Fox, III | A61B 90/70 |
| 2019/0337786 A1* | 11/2019 | Hayakawa | B65B 55/04 |
| 2021/0269298 A1* | 9/2021 | Hayakawa | B67C 3/22 |
| 2021/0353803 A1* | 11/2021 | Baust | A61L 2/22 |
| 2023/0202696 A1* | 6/2023 | Hayakawa | A61L 2/186 |
| | | | 53/426 |

FOREIGN PATENT DOCUMENTS

| | | |
|---|---|---|
| EP | 0297010 B1 | 8/1991 |
| RU | 2068644 C1 | 11/1996 |
| WO | WO2003039731 A1 | 5/2003 |
| WO | 2008086347 A1 | 7/2008 |
| WO | WO2013022785 A2 | 2/2013 |

* cited by examiner

CONTINUOUS ELEMENT DECONTAMINATION AND STERILIZATION SYSTEM

The current application claims a priority to the U.S. Provisional Patent application Ser. No. 63/107,366 filed on Oct. 29, 2020.

FIELD OF THE INVENTION

The present invention generally relates to the field of decontamination and/or sterilization, and/or physicochemical treatment of elements and/or devices for the medical industry. More specifically, the decontamination and/or sterilization, and/or physicochemical treatment of elements and/or medical devices found in hospital, pharmaceutical industry, biotechnology industry, or research laboratories. Additionally, the present invention is not limited to such application, it is also applicable to the food industry, chemical industry, the decontamination of biological waste, polymers, rubber and composite curing.

BACKGROUND OF THE INVENTION

Most of sterilization systems used by hospitals, laboratories and other industries, performing the sterilization processes via batch method. Depending on the machine capacity, the elements in question stay in queue until there is enough elements to be treated within the same cycle parameters and fulfill the capacity of the chamber.

The capacity of the chamber has a direct correlation with the financial aspect of performing a sanitizing cycle, therefore the number of elements in queue must be a reasonably economic amount to proceed with the process. The productivity of these machines and idle time is directly correlated to the conditioning and change of ambient condition within the chambers and the elements in it.

The aforementioned machines have sterilization process variability issues inherent to their design, this variability is caused by the so-called "load weight", being the load weight characterized by elements distribution, type, and amount loaded into the chamber. Various attempts of improvement to avoid distribution and weight issues have been investigated and explored in previous patents.

One of the main factors evaluated by users when selecting a sterilizer, is the consumption of resources and waste, as this can yield great costs and an ecological impact. For example, a traditional autoclave needs to do the following with the total volume of the chamber: expel the air (vacuum), preheat, fill with steam, compensate for water loses and heat in the form of condensation, eject the steam, reduce drain fluid's temperature before reaching sewer (usually with chilled water), dry wet elements, and cool down the interior. The previous steps consume vast amount of energy in the form of heat and mechanical work for vacuum pumps, water in the form of steam, as coolant and to generate vacuum (water ring pump).

In patent EP0138688A2, the system mentions one or more baskets, as flow directing device with fan(s) to generate a cross flow of gas or mixture, but similar to prior art and popular equipment in use in diverse industries, this equipment describes one chamber where all the elements and baskets are processed simultaneously with the exact same cycle conditions, in fact EP0138688A2 main objective is to homogenize the treatment conditions along all the baskets in the embodiment.

Patent US20140301895A1 describes an in-line sterilizer with a conveyor that moves the elements to be treated through chambers isolated by a system of sliding doors. This system does not express the concept of normalizing the conditions by use of what we call in our embodiment, a transition chamber. There is a mention of a dwell chamber, but this is used in a similar way to what our embodiment calls pre- or post-conditioning chambers. By not including a normalization or equalizer chamber, the conditions in the different chambers cannot remain constant while processing and transporting the elements.

Thus, the elements to be sterilized cannot flow continuously or semi-continuously through the steps in the cycle without impacting each module's ambient. There is a need to adapt the chambers where the process allows for opening of chamber doors with a connected module, in order to make the embodiment perform as a continuous in-line processing sterilizer. The aforementioned patent also limits the concept to an in-line connection of the modules.

U.S. Pat. No. 4,707,334A, is directed toward a sterilization system. The patent describes a chamber, in which an atmosphere comprising a toxic vapor is established, is pneumatically isolated from the ambient environment. The isolation technique permits objects to be sterilized, to be conveyed into and removed from the chamber without leakage of vapor from the chamber or of air into the chamber.

U.S. Pat. No. 4,707,334A is applicable only for processes where the sterilization method does not require pressurization or low/medium vacuum. Thus, its application range is limited. Therefore, an invention that overcome the above-mentioned disadvantages is needed.

DETAIL DESCRIPTIONS OF THE INVENTION

All illustrations of the drawings are for the purpose of describing selected versions of the present invention and are not intended to limit the scope of the present invention.

Figure 1:
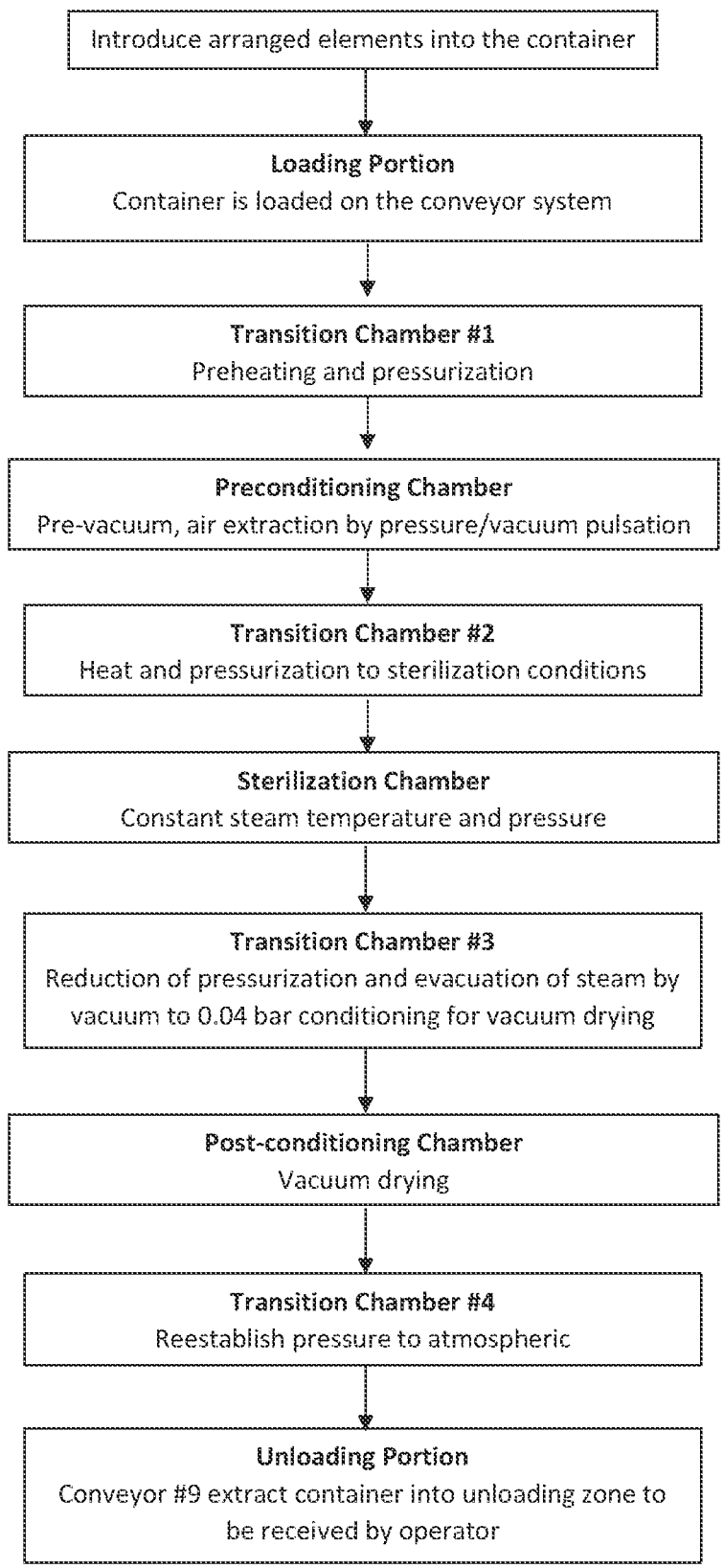
FIG. 1 is an overview of an embodiment for the working sequence of the method for the present invention.
Figure 2:
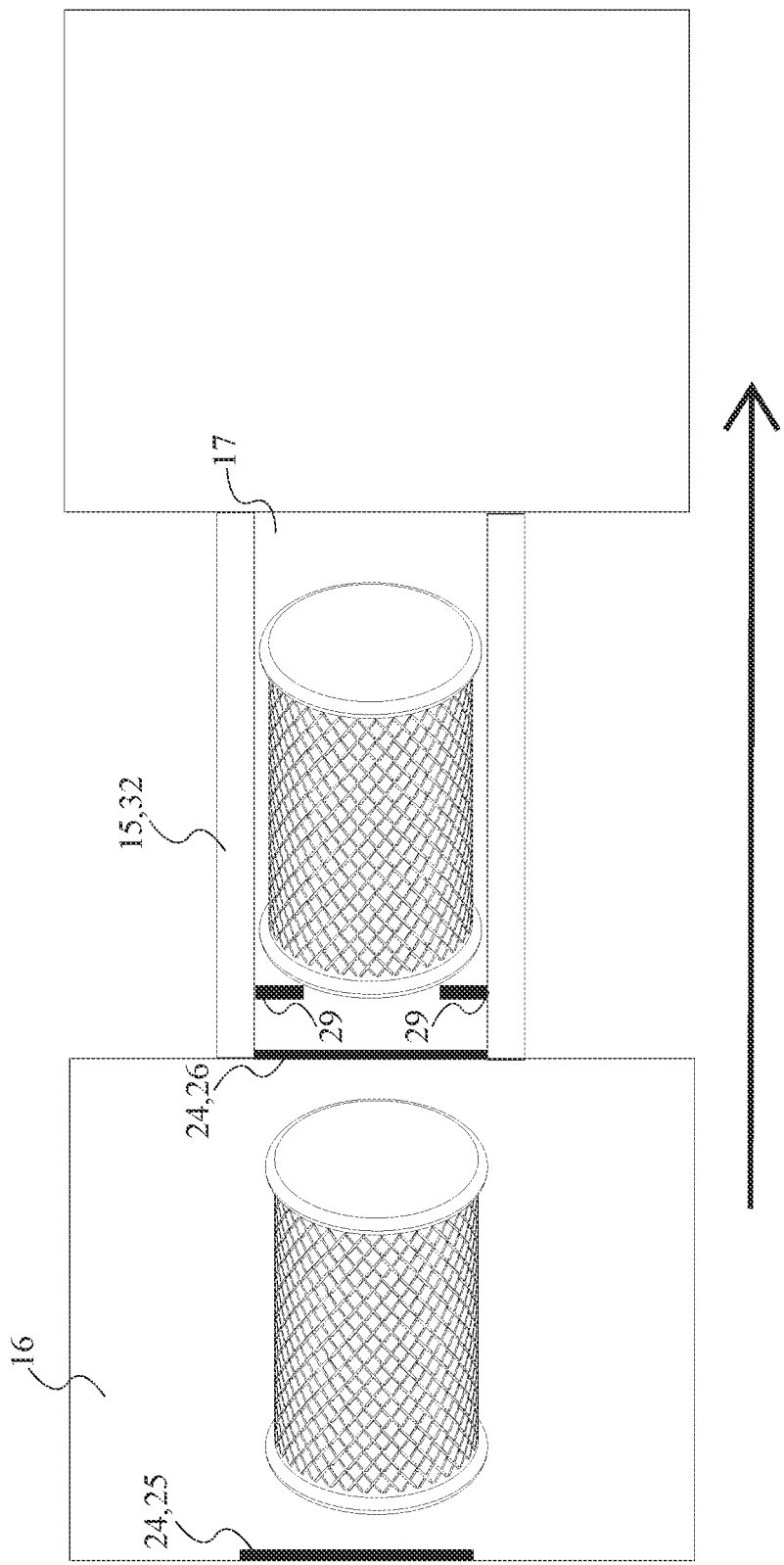
FIG. 2 is an illustration of a plurality of containers traversing from an operation chamber to a transition chamber.
Figure 3:
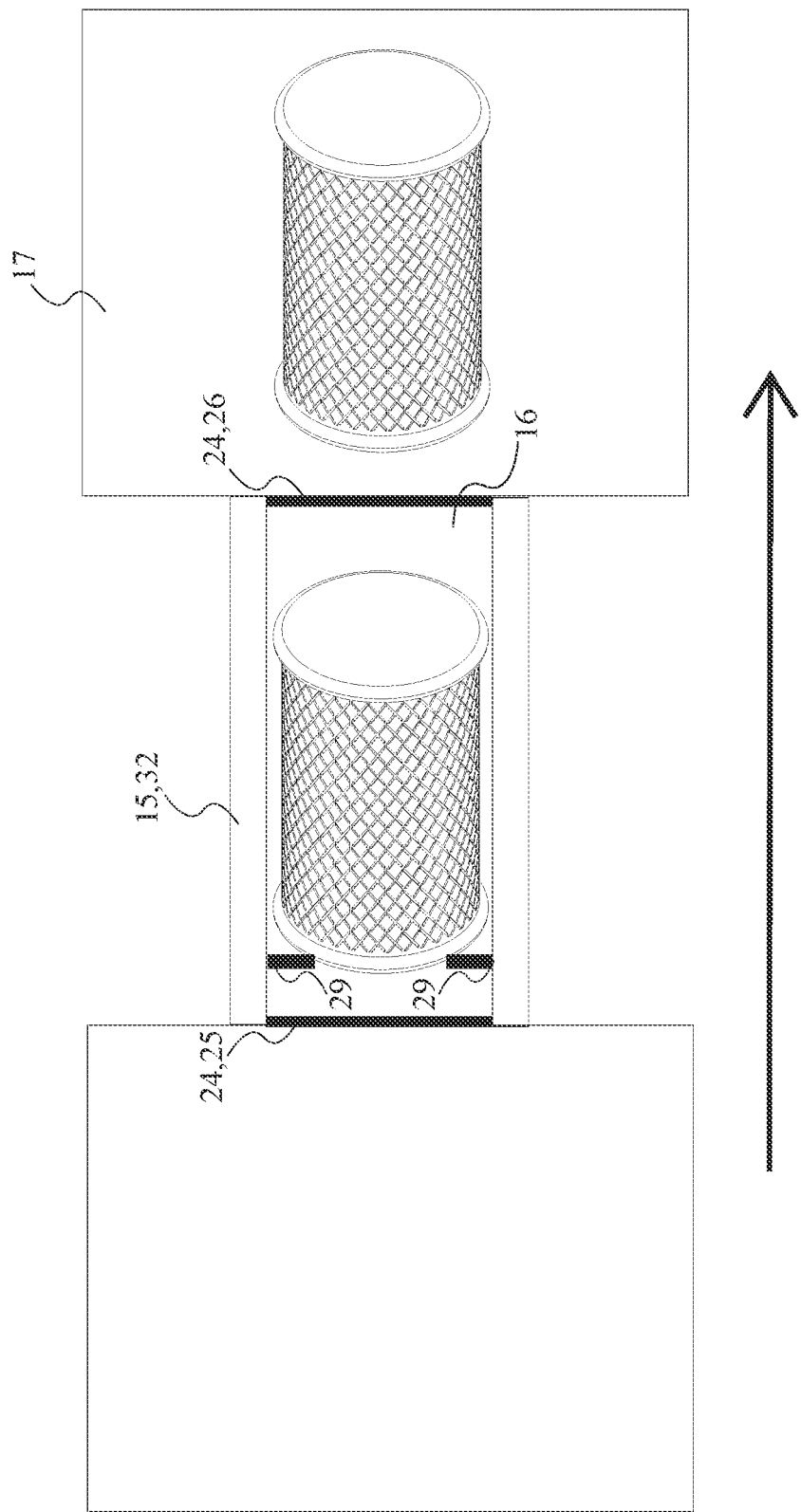
FIG. 3 is an illustration of a plurality of containers traversing from a transition chamber to an operation chamber.
Figure 4:
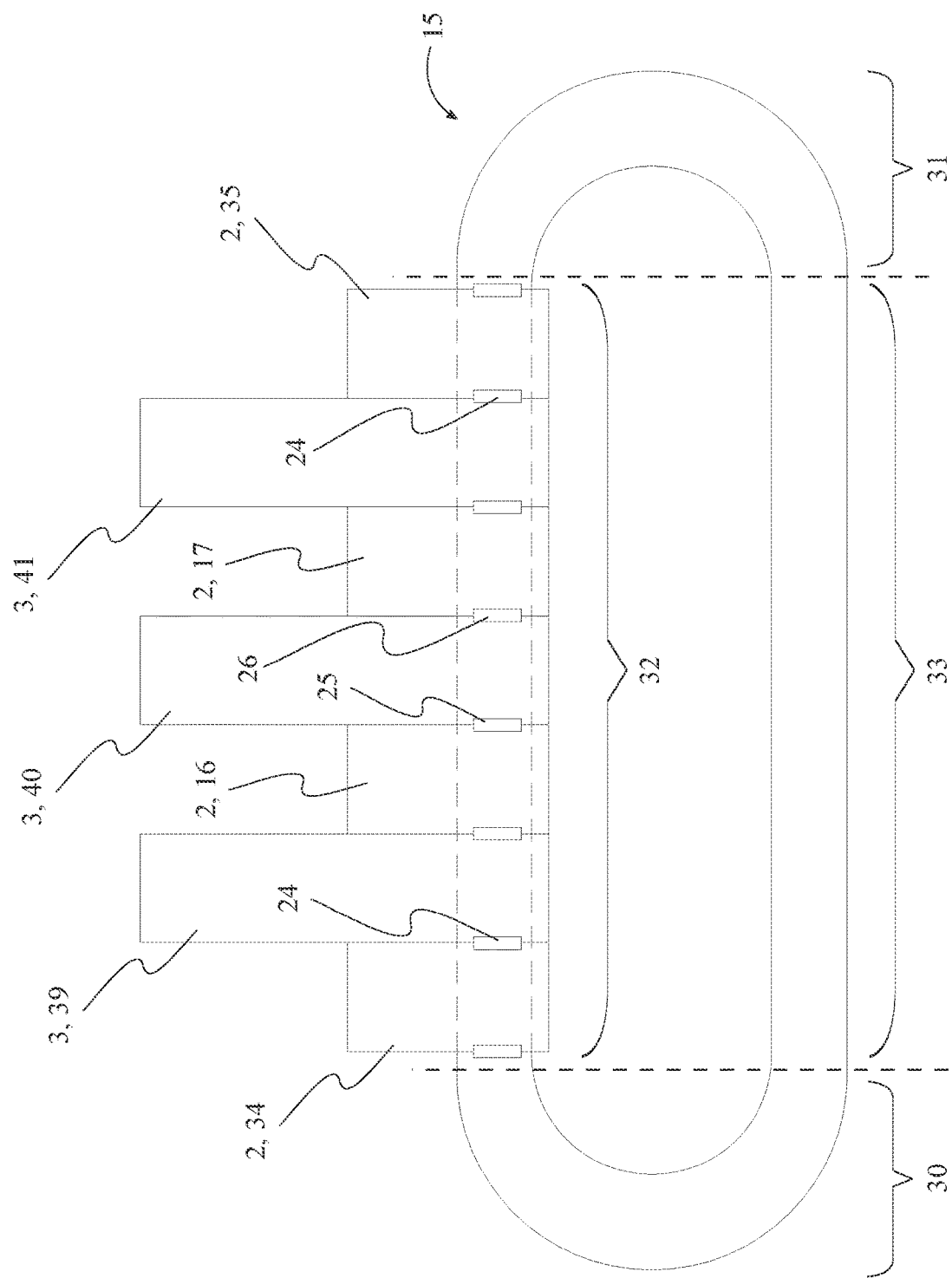
FIG. 4 is a configuration and arrangement of the system for the present invention.
Figure 5:
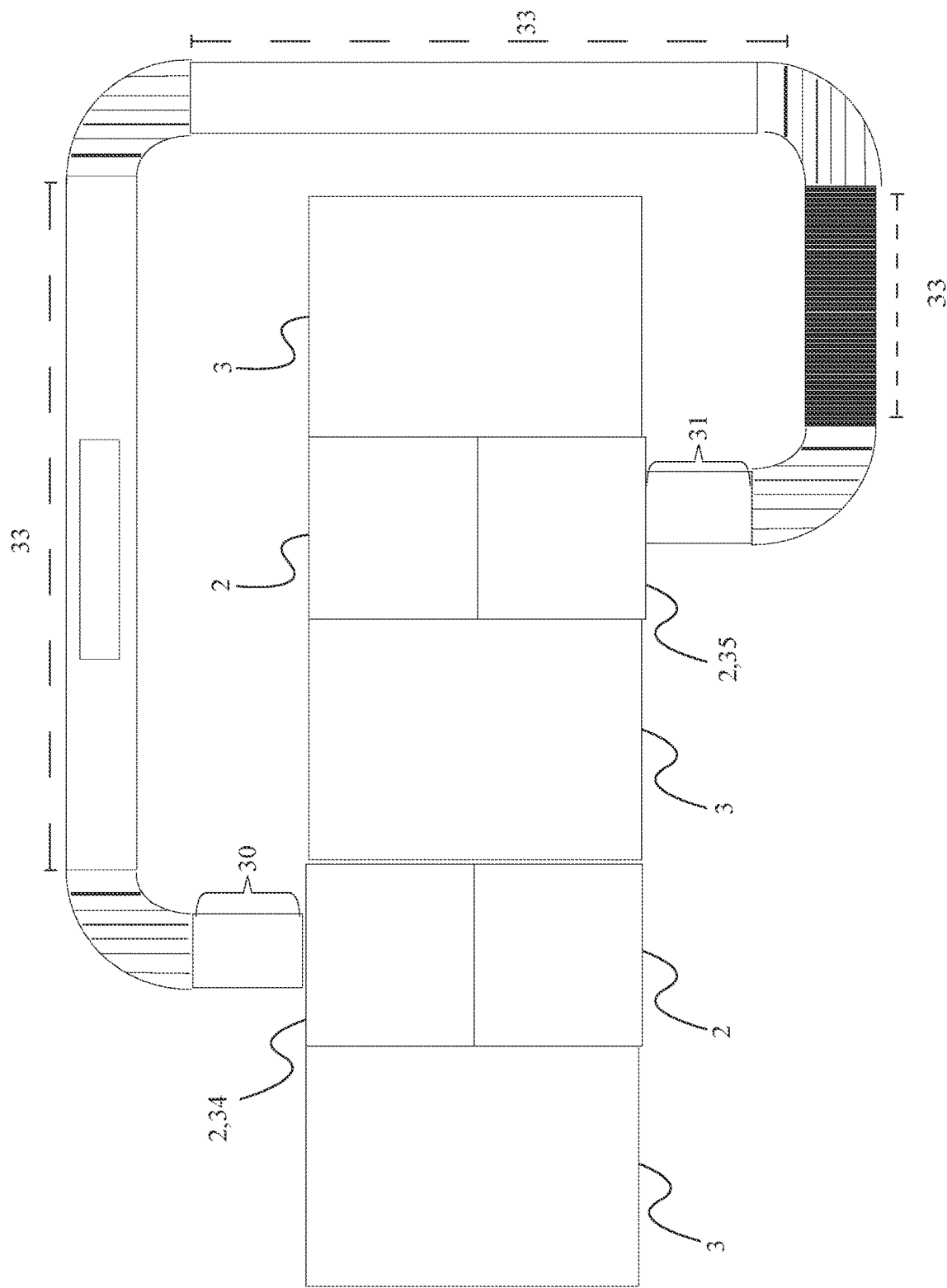
FIG. 5 is an alternate configuration and arrangement of the system for the present invention.
Figure 6:
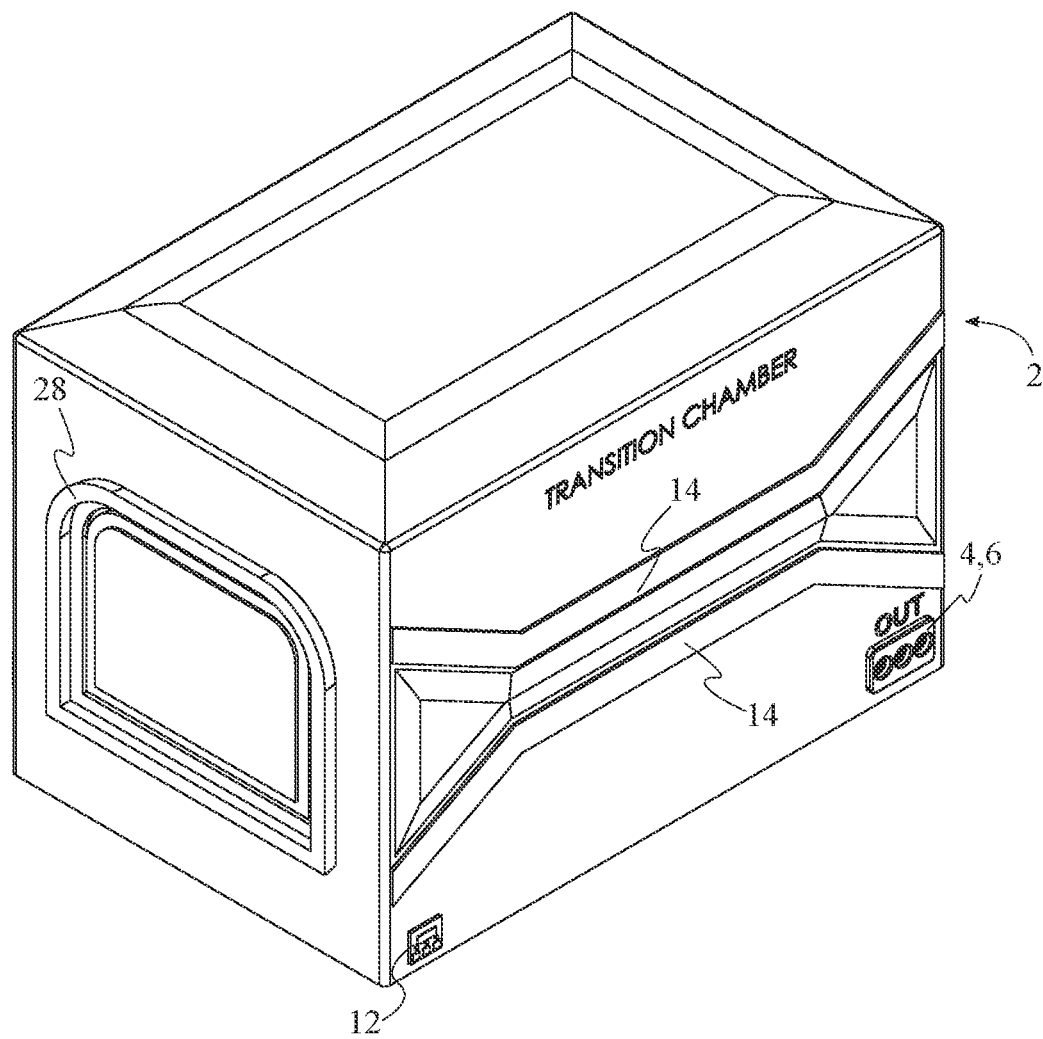
FIG. 6 is an isometric perspective view of a transition chamber for the present invention.
Figure 7:
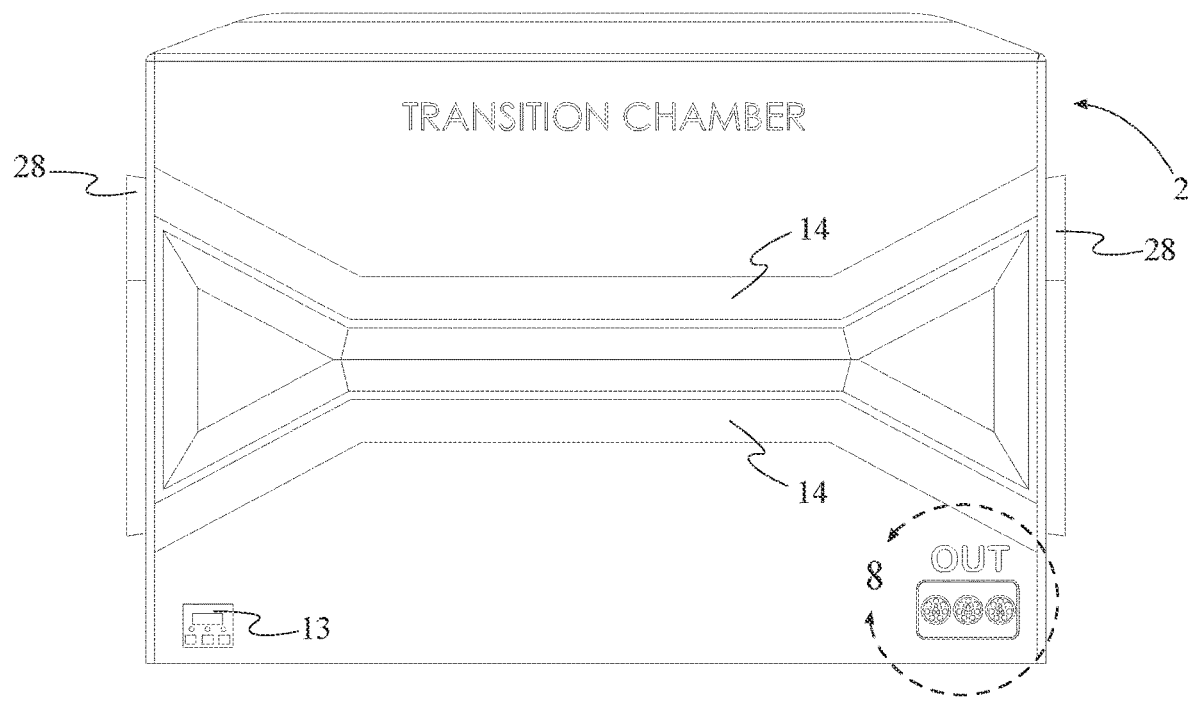
FIG. 7 is a right view of the transition chamber of the present invention.
Figure 8:
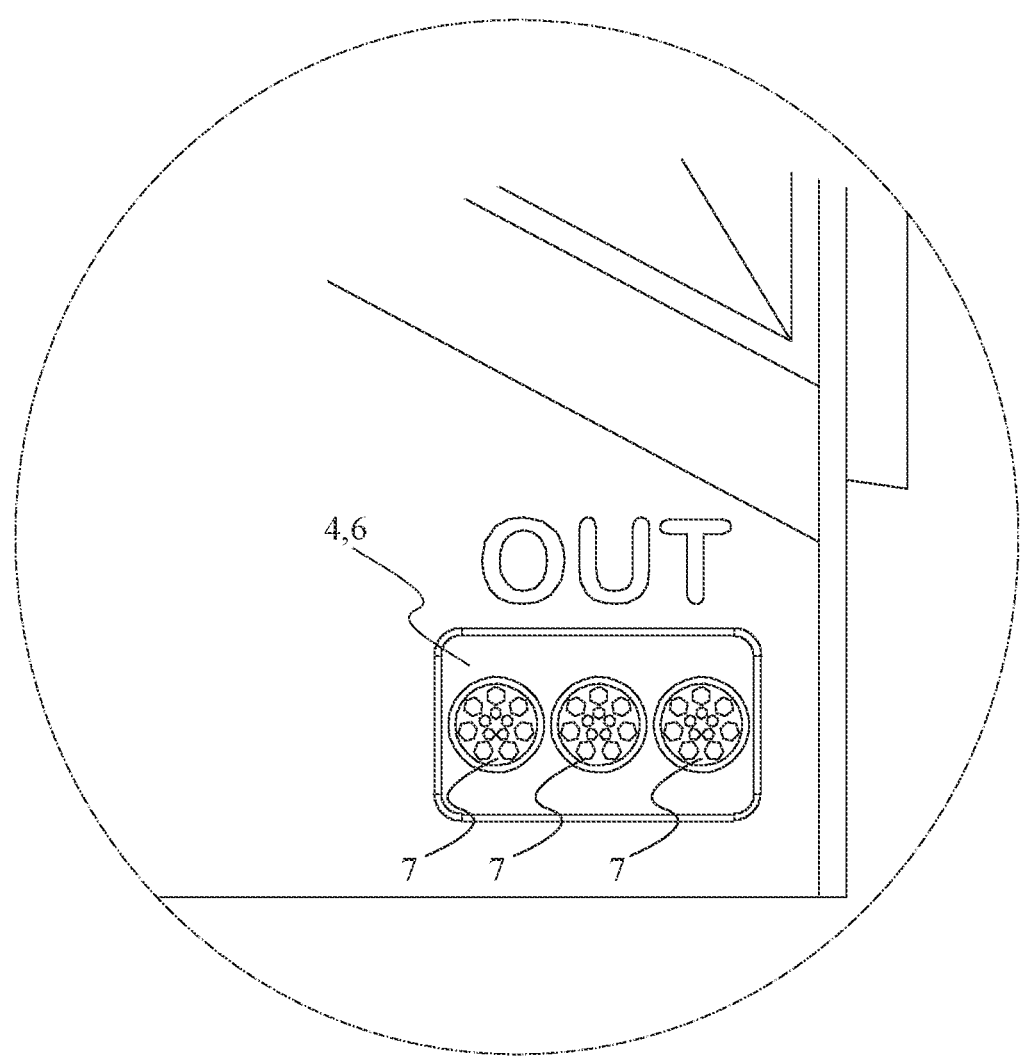
FIG. 8 is a magnified view of a plurality of transition chambers for the present invention as seen in FIG. 7.
Figure 9:
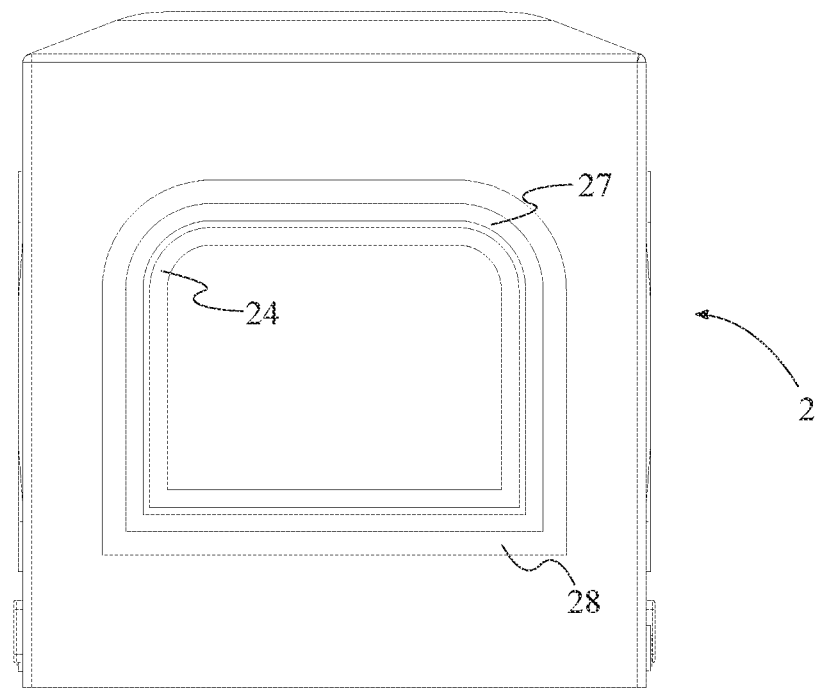
FIG. 9 is a front view of a transition chamber for the present invention.
Figure 10:
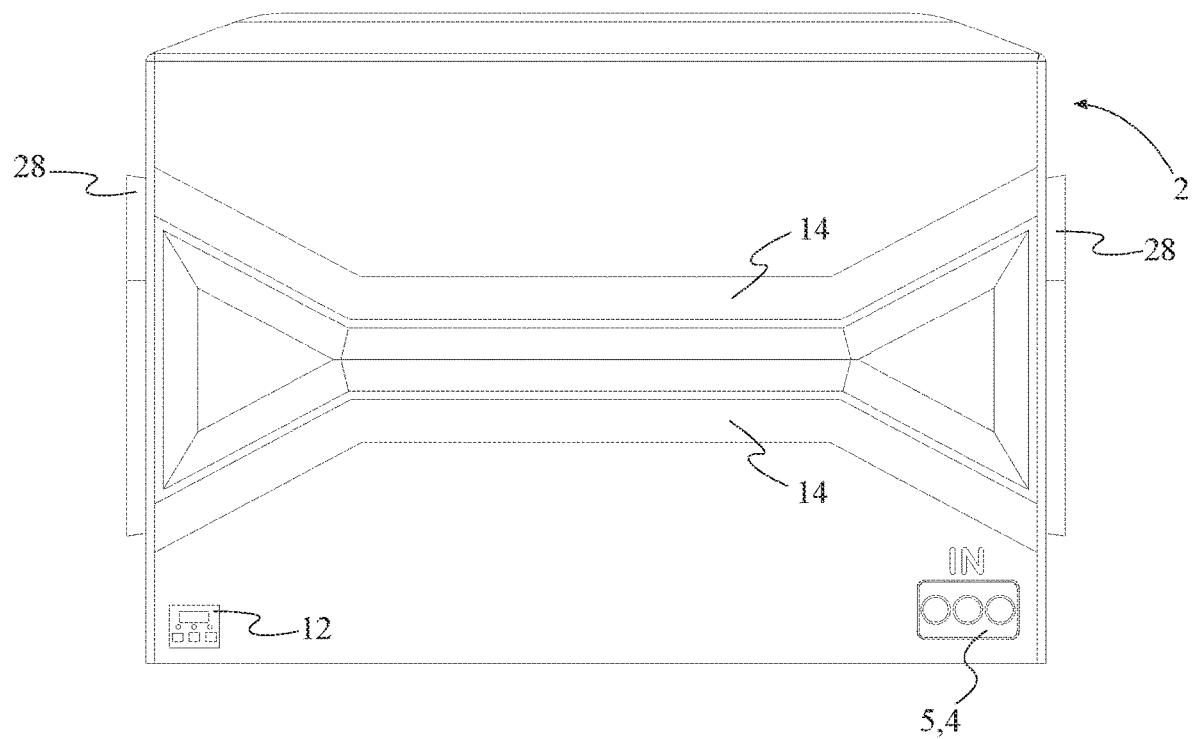
FIG. 10 is a left view of a transition chamber for the present invention.
Figure 11:
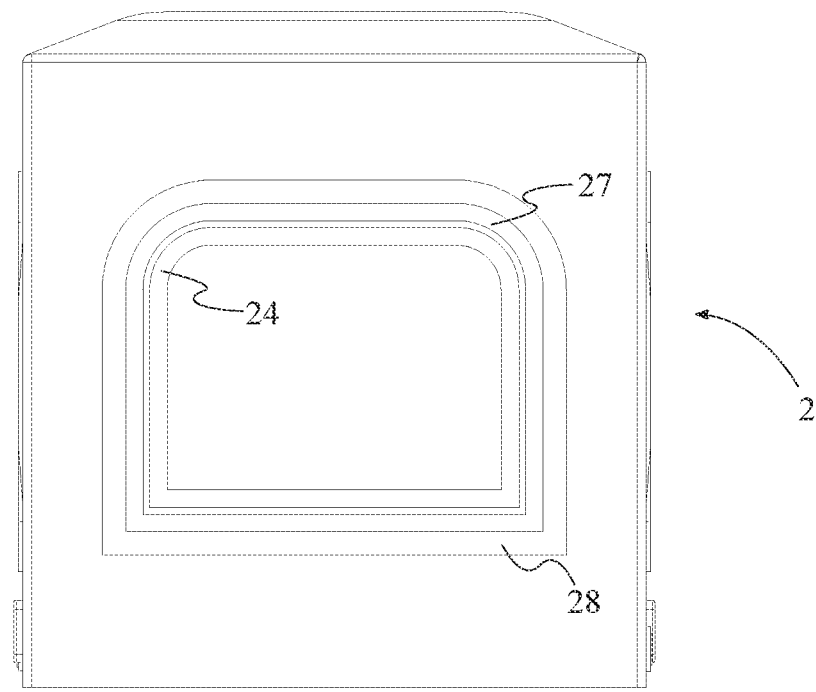
FIG. 11 is a rear view of a transition chamber for the present invention.
Figure 12:
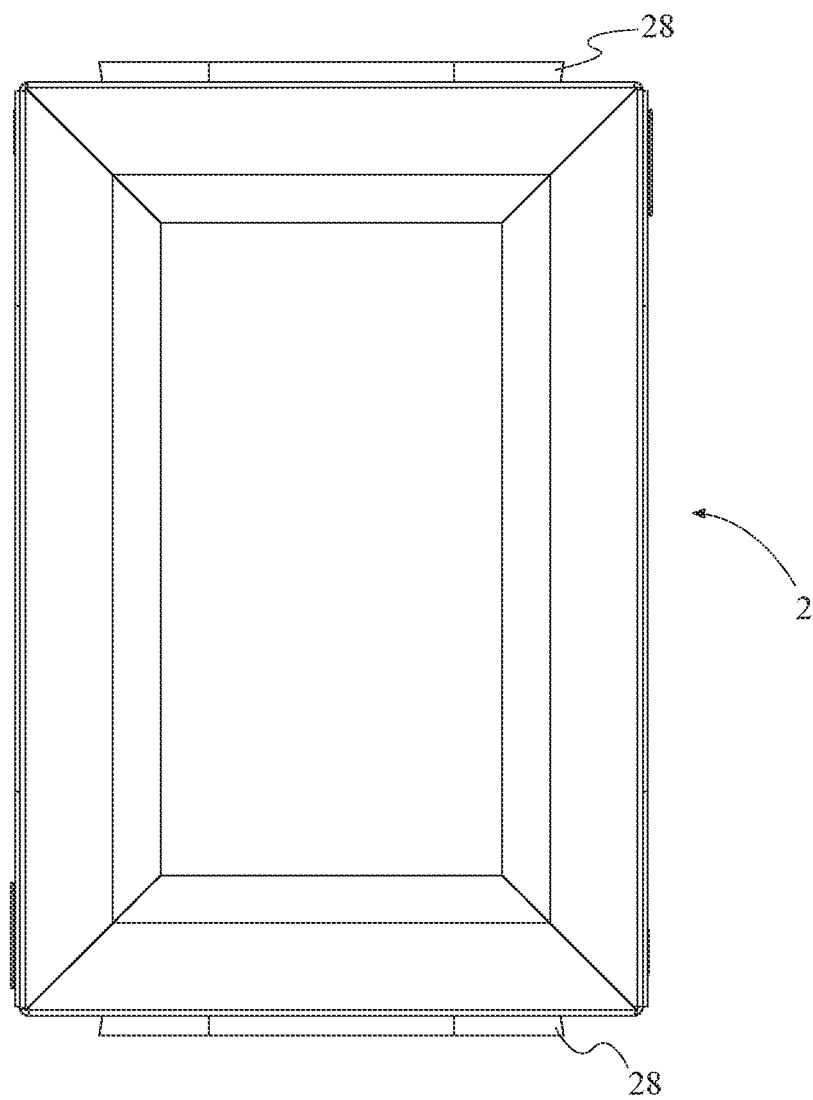
FIG. 12 is a top view of a transition chamber for the present invention.
Figure 13:
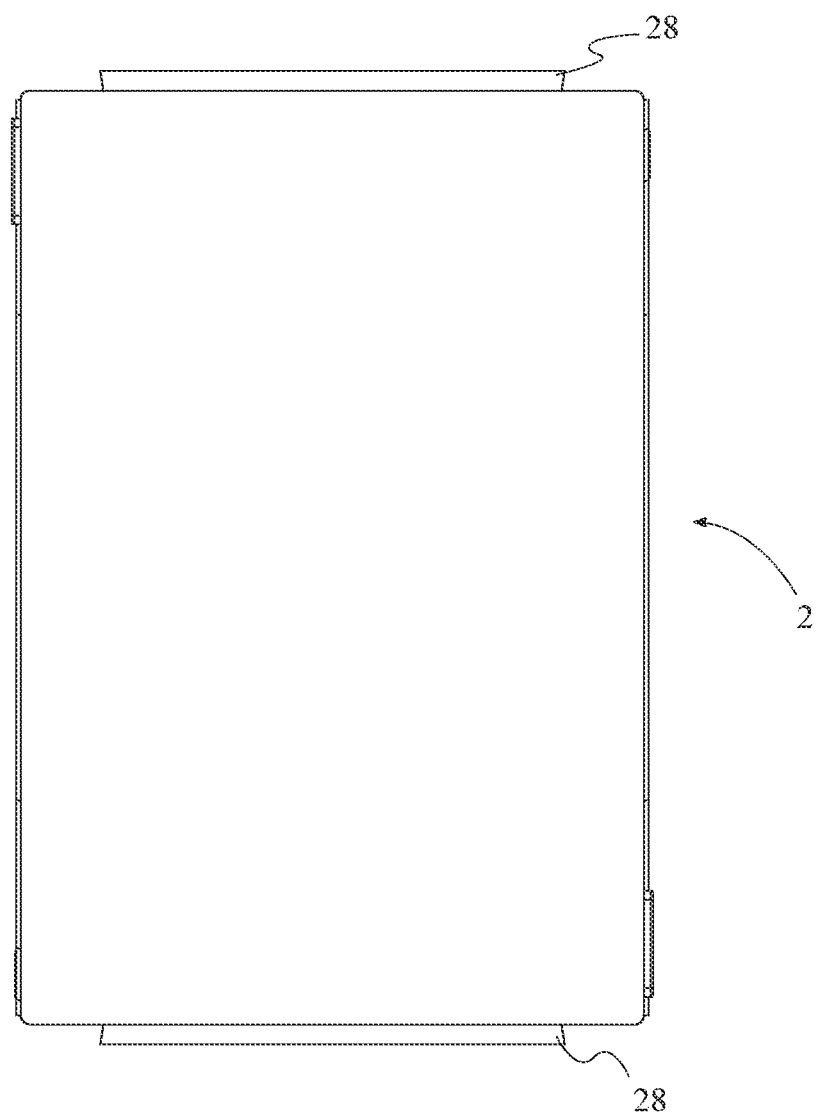
FIG. 13 is a bottom view of a transition chamber for the present invention.
Figure 14:
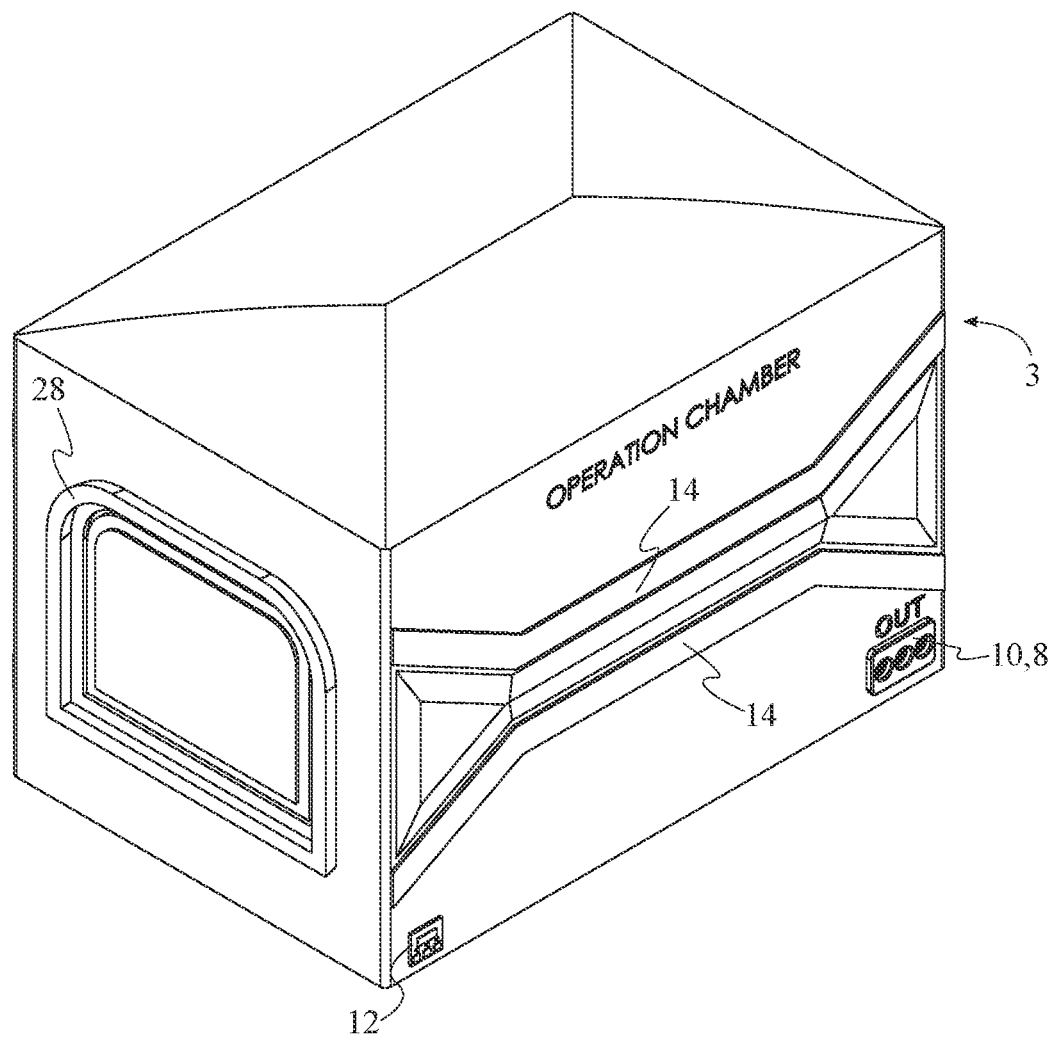
FIG. 14 is an isometric perspective view of an operation chamber for the present invention.
Figure 15:
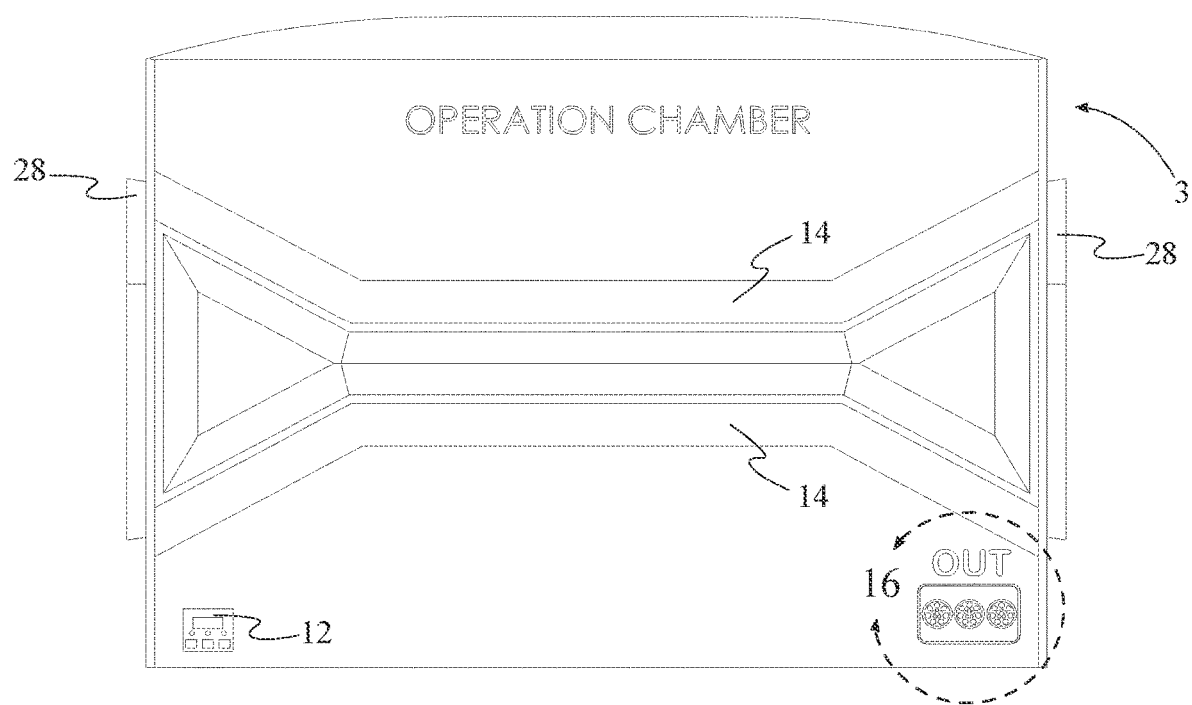
FIG. 15 is a right view of the operation chamber of the present invention.
Figure 16:
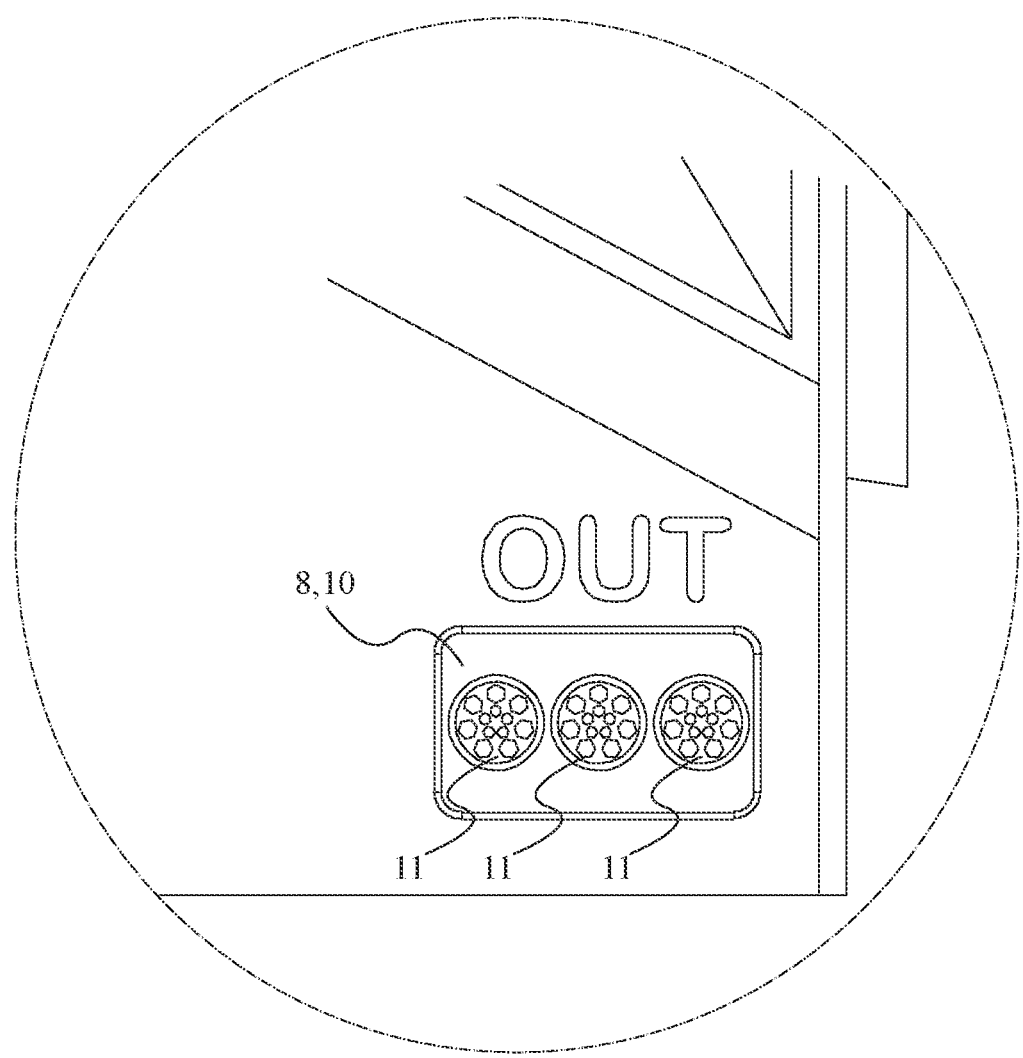
FIG. 16 is a magnified view of a plurality of operation chambers for the present invention as seen in FIG. 15.
Figure 17:
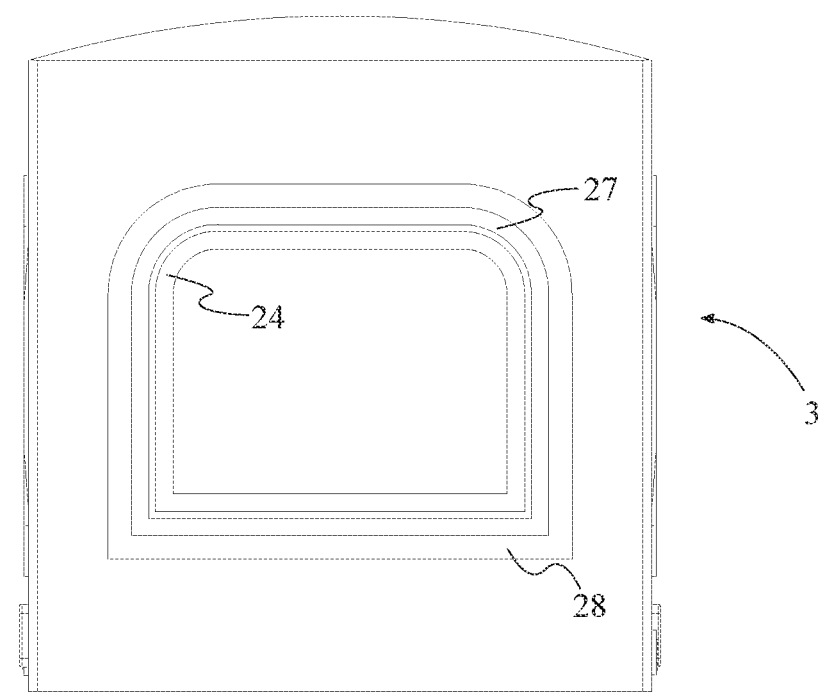
FIG. 17 is a front view of an operation chamber for the present invention.
Figure 18:
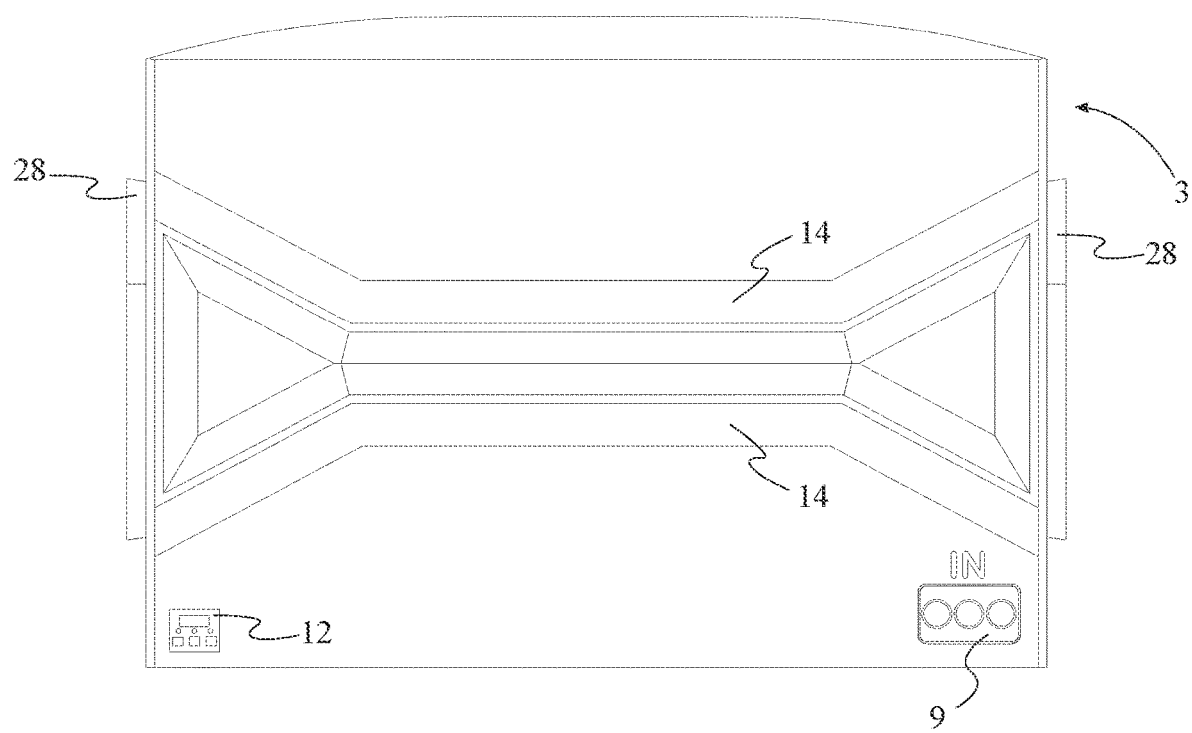
FIG. 18 is a left view of an operation chamber for the present invention.
Figure 19:
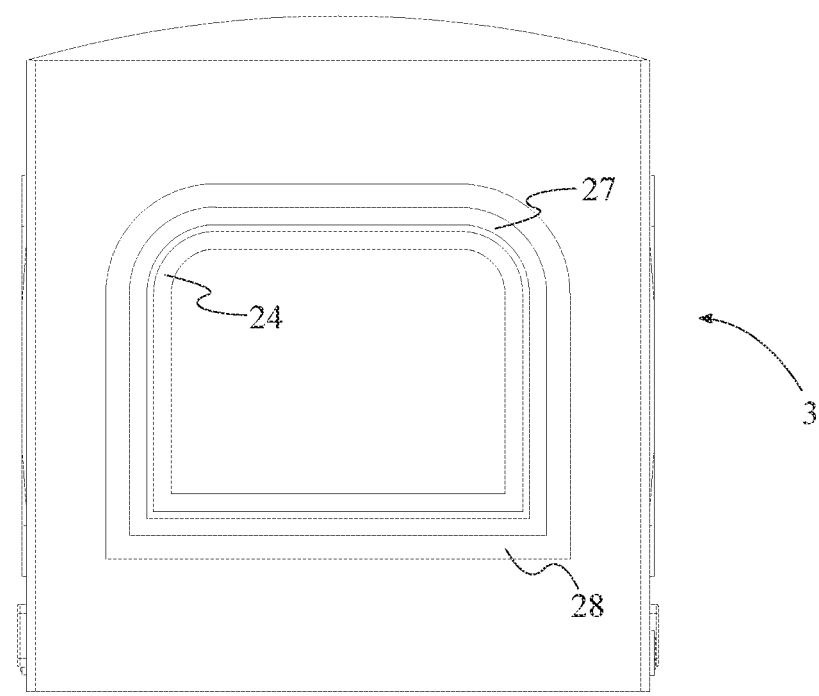
FIG. 19 is a rear view of an operation chamber for the present invention.
Figure 20:
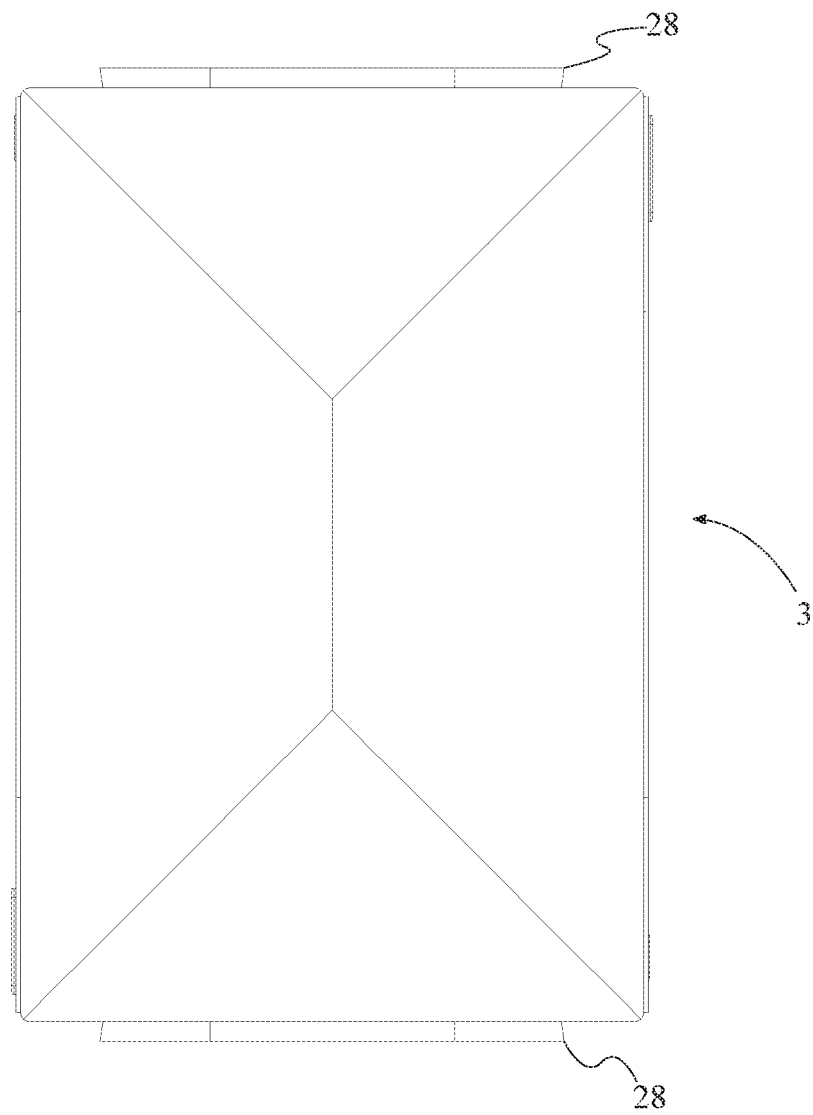
FIG. 20 is a top view of an operation chamber for the present invention.
Figure 21:
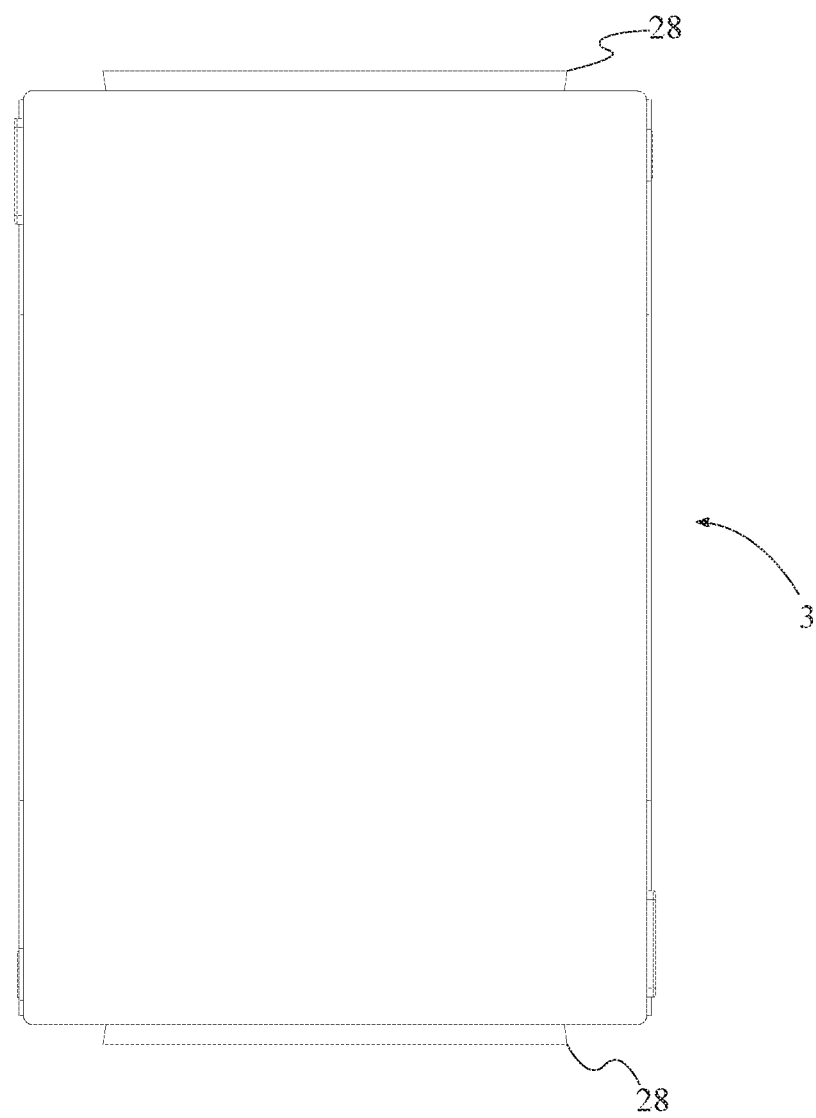
FIG. 21 is a bottom view of an operation chamber for the present invention.
Figure 22:
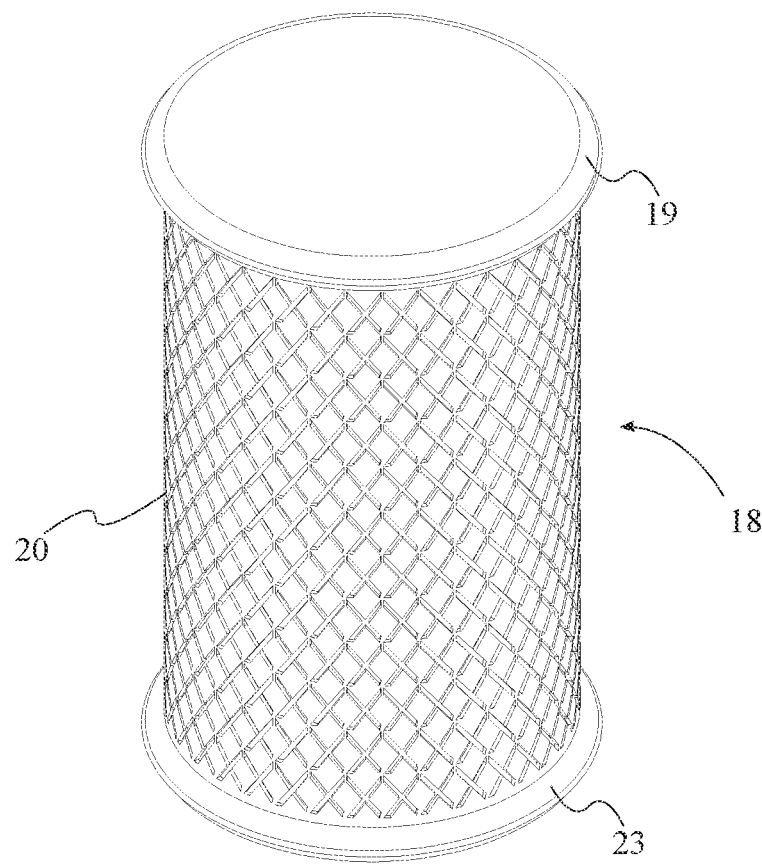
FIG. 22 is an isometric perspective view of a container from a plurality of containers for present invention.
Figure 23:
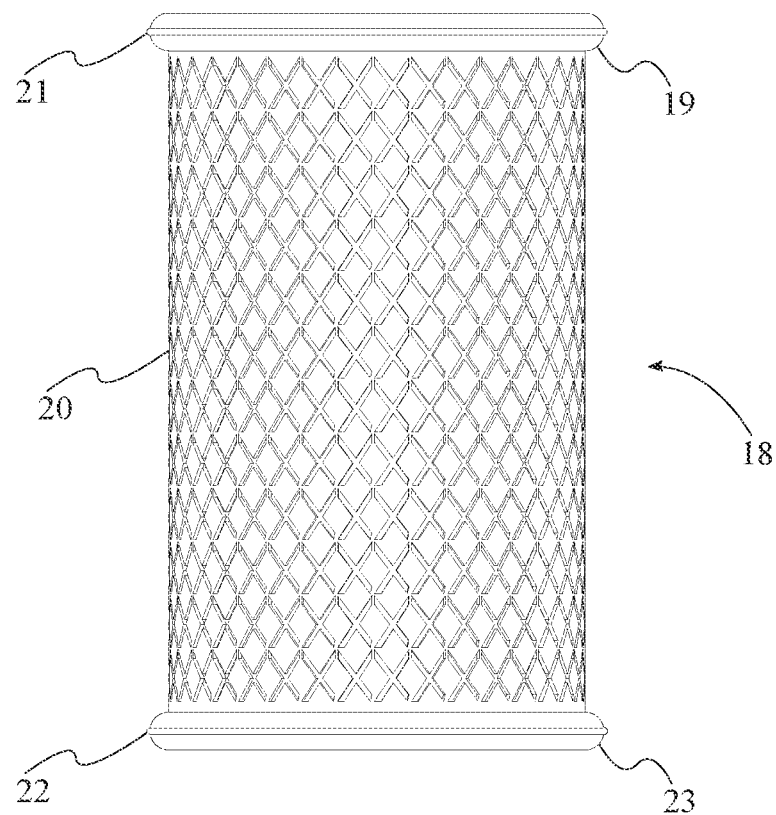
FIG. 23 is a front view of a container from a plurality of containers for the present invention.
Figure 24:
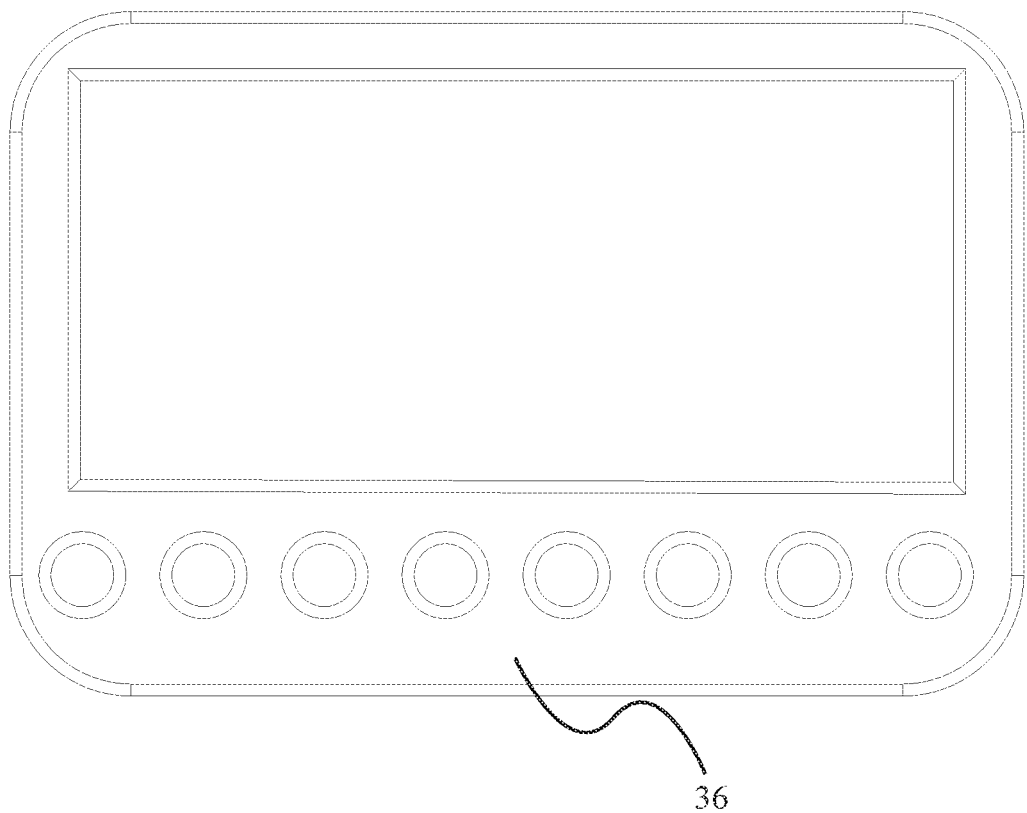
FIG. 24 is a top view of a programmable controller with a human machine interface for the present invention.
Figure 25:
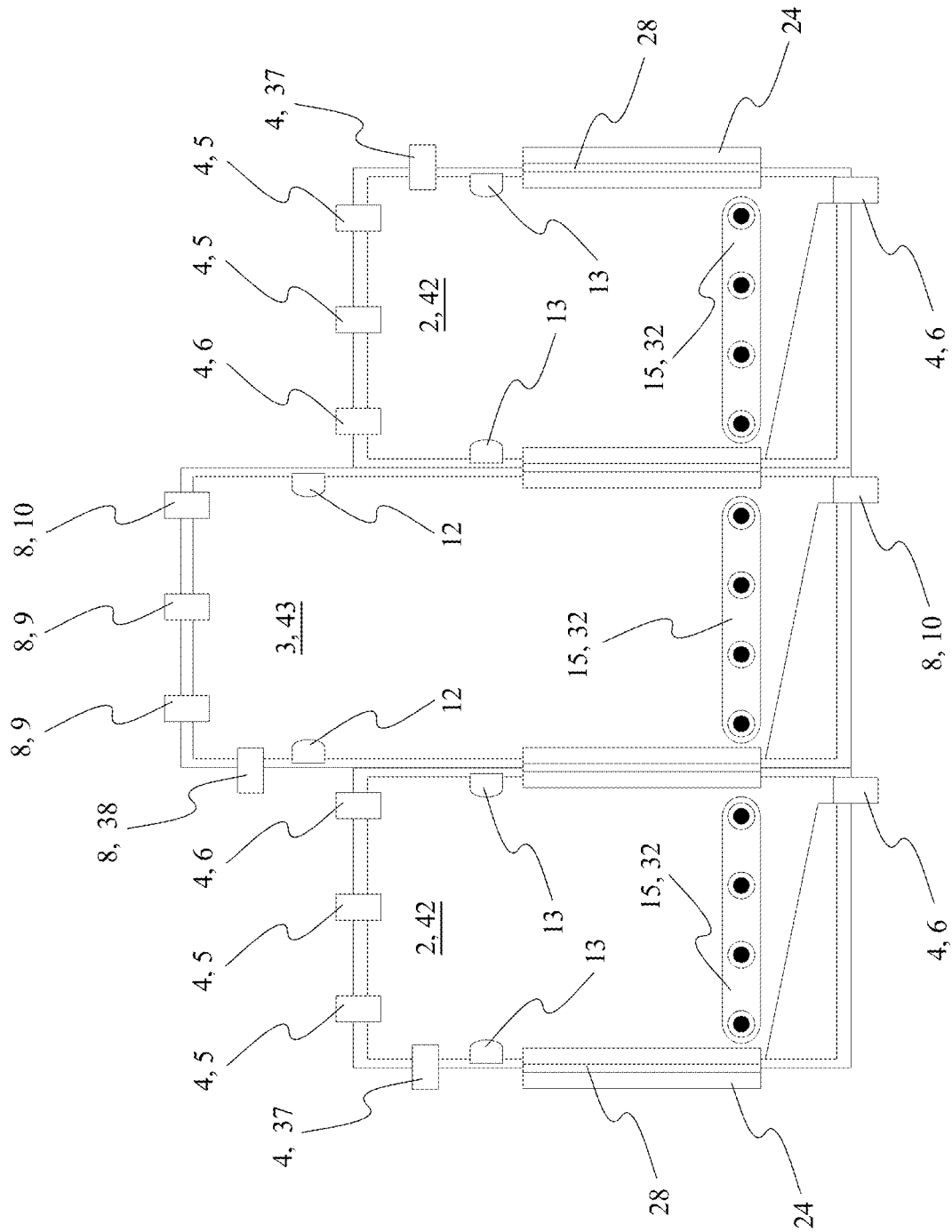
FIG. 25 is a schematic view of an operation chamber sandwiched between two transition chambers used in the present invention.
Figure 26:
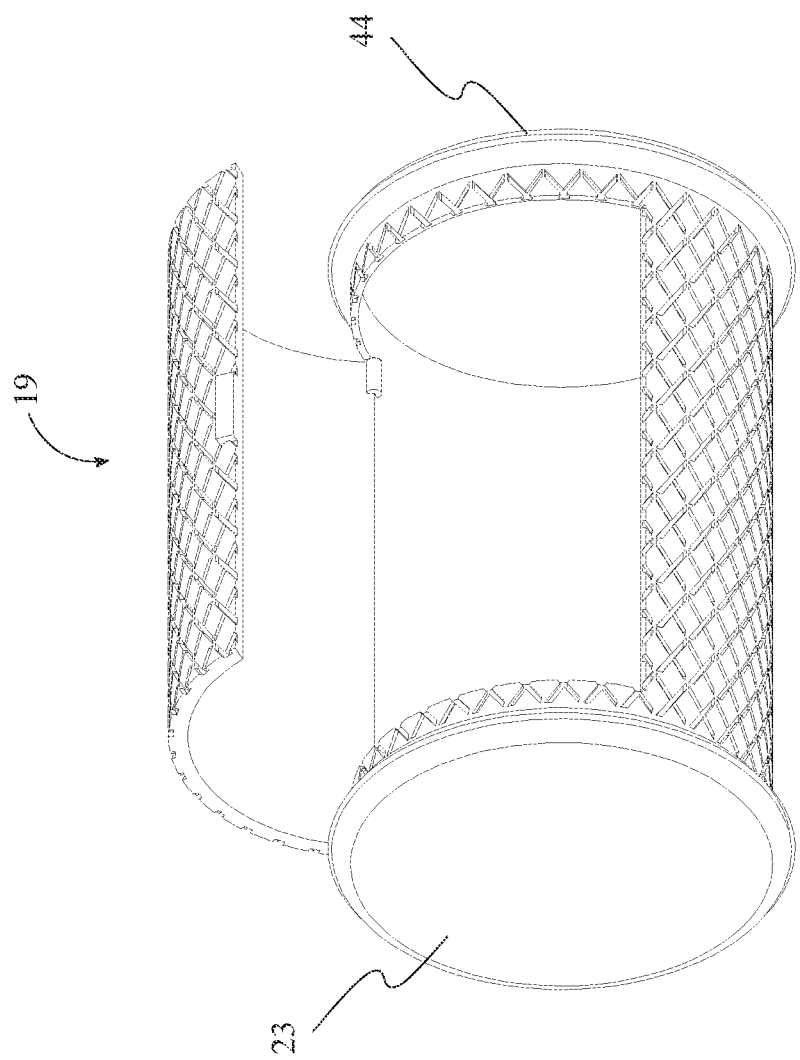
FIG. 26 is an isometric perspective view of a container in an open configuration.
Figure 27:
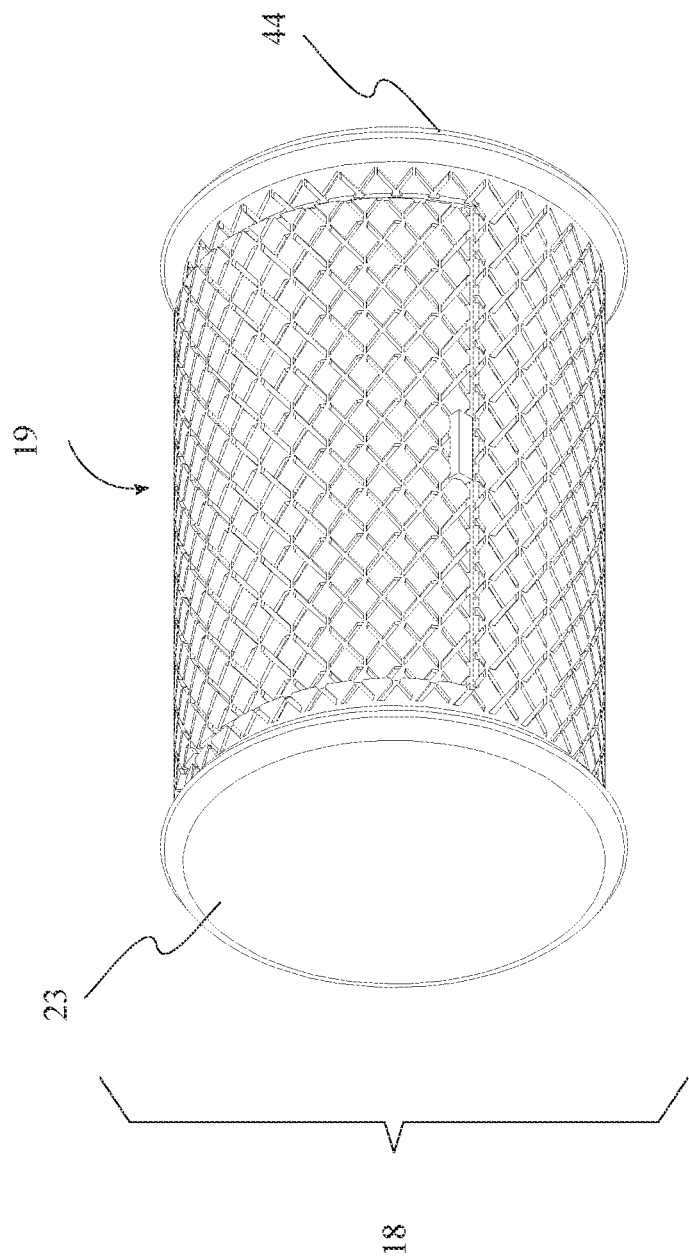
FIG. 27 is an isometric perspective view of a container in a closed configuration.

Referring to FIG. 1 through FIG. 24, the present invention is a decontamination and sanitization system designed to perform various types of sanitization processes. The present invention comprises, a plurality of operation chambers 3, and a plurality of transition chambers 2. A conveyor system 15 traverses through each of the plurality of operation chambers 3 and each of the plurality of transition chambers 2. The elements to be sanitized travel throughout the present invention via the conveyor system 15. The elements travel inside a container 18, which travels through an arrangement and series of operation chambers 3 and transition chambers 2. The internal condition of each of the operation chambers 3 and each of the transition chambers 2 varies to perform a specific processing stage which guarantees a complete sanitization cycle.

The preferred embodiment of the present invention comprises a plurality of transition chambers 2, a plurality of operation chambers 3, a plurality of transition ports 4, a plurality of operation ports 8, at least one conveyor system 15, and at least one container 18. The plurality of transition chambers 2 is made up of a collection of tubular structures that serve as waypoints between the various chambers of the system. The plurality of operation chamber is made of a collection of chambers used to perform stages along the sanitization process. The plurality of transition ports 4 is made up of a collection of ports which are located on a transition chamber from the plurality of transition chambers 2. The transition ports 4 allow for entry and exit of fluids and/or similar from the transition chamber for the present invention. The geometrical profile of the transition ports 4 from the plurality of transition ports 4 is circular, however the geometrical profile may comprise any shape which fulfills manufacturing, design and or user requirements. Similarly, the plurality of operation ports 8 is made up of a collection of ports which are located on an operation chamber from the plurality of operation chambers 3. The operation ports allow for entry and exit of fluids and/or similar from the operation chamber for the present invention. The geometrical profile of the operation ports from the plurality of operation ports 8 is circular, however the geometrical profile may comprise any shape which fulfills manufacturing, design and or user requirements. The conveyor system 15 for the present invention is a continuous conveyor system 15. A continuous conveyor system 15 is one where objects placed at a beginning point are continuously displaced through the system until reaching the end of the cycle, where this action is maintained in time. For the preferred embodiment of the present invention, the conveyor system 15 is designed and arranged to match the configuration of the plurality of operation chambers 3 and the plurality of transition chambers 2. Therefore, the conveyor system 15 are not limited to said configuration, as the figures in the present invention are intended simply to describe the present invention, and not to limit the scope of such. The container 18 for the present invention is a permeable vessel comprising a cylindrical profile. However, the present invention is not limited to such geometrical profile and may comprise any geometrical profile which satisfies manufacturing, design and/or user requirements. Each of the plurality of operating chambers is connected in between a preceding chamber 16 and a subsequent chamber 17. As a result, the physicochemical conditions in a first operation chamber is isolated from the physicochemical conditions within a second operation chamber. Additionally, the preceding chamber 16 and the subsequent chamber 17 are from the plurality of transition chambers 2. This configuration enables the operation chambers 3 and the transition chambers 2 to form a continuous sanitization unit where a collection of contaminated items is subjected to a series of physicochemical operations in order to sanitize said items. Additionally, the configuration of the plurality of operation chambers 3 and the plurality of transition chambers 2 enables the present invention to isolate each operation chamber, such that each operation required conditions are maintained in their optimal to perform the treatment without cross exchange of their physicochemical ambient characteristics used in any of the operation chambers 3. That is, the plurality of transition chambers 2 serves as a conditioning path between the plurality of operation chambers 3 working conditions. Furthermore, an arbitrary plurality of transition ports 37 is integrated into each of the plurality of transition chambers 2, wherein the arbitrary plurality of transition ports 37 is from the plurality of transition ports 4. As a result, the arbitrary plurality of transition ports 37 from the plurality of transition ports 4 provide an access points to control the environment of the transition chambers 2. Thus, the transition ports 4 allow for an inlet or outlet of fluids and/or similar, which are utilized during a sanitization cycle. Similarly, an arbitrary plurality of operation ports 38 is integrated into each of the plurality of operation chambers 3, wherein the arbitrary plurality of operation ports 38 is from the plurality of operation ports 8. Consequently, the arbitrary plurality of operation ports 38 from the plurality of operation ports 8 provide an access point to control the environment of the operation chambers 3. Thus, the operation ports allow for an inlet or outlet of fluids and/or similar, which are utilized during a sanitization cycle. Additionally, the conveyor system 15 for the present invention is operatively coupled between the plurality of operation chambers 3 and the plurality of transition chambers 2, wherein the conveyor system 15 moves the container 18 in between the plurality of operating chambers and the plurality of transition chambers 2. Accordingly, the container 18 then securely and safely travels through the plurality of transition chambers 2 and operation chambers 3. The securing of the container 18 ensures proper sanitization when the present invention is in use.

Furthermore, the plurality of operation chambers 3 comprises at least one preconditioning chamber 39, at least one sterilization chamber 40, and at least one postconditioning chamber 41. The precondition chamber allows for preconditioning of the elements within the container 18. Due to the importance to perform several different steps or sub-cycles to accommodate the elements to be treated before and after the sterilization stage or sub-cycle, in order to achieve the level of performance and reliability in the processing, during the sanitization cycle. Therefore, the application of the stages performed within the preconditioning chamber 39 are essential, thus the presence of a preconditioning chamber 39 is necessary for a continuous processing. The sterilization chamber 40 for the present invention allows for sanitization of the elements within the container 18. The sterilization chamber 40 is where the environment is at the correct physicochemical conditions in order to successfully sanitize the elements within the container 18. The postconditioning chamber 41 allows for postcondition of the elements within the container 18. Similar to the preconditioning chamber 39, the postconditioning chamber 41 allows for a change in temperature, pressure, reduction of chemical concentration levels or any other physicochemical conditioning after the elements in the container 18 have been sanitized. Therefore, the postconditioning chamber 41 also avoids undesired effects such as thermal shock and fatigue. The preconditioning chamber 39, the sterilization chamber 40, the postconditioning chamber 41 and the plurality of transition chambers 2 are serially connected. As a result, the preconditioning chamber 39 is always located before the sterilization chamber 40, and the postconditioning chamber 41 is always located after the sterilization chamber 40. Additionally, there is always a transition chamber before and after the preconditioning chamber 39, the sterilization chamber 40 and the postconditioning chamber 41. As previously mentioned, the sterilization chamber 40 is positioned in between the preconditioning chamber 39 and the postconditioning chamber 41. As a result, the present invention ensures the stages in the cycle are performed continuously with minimal or none system downtime while the containers 18 go through the sanitization process. Furthermore, the conveyor system 15 is operatively coupled between the preconditioning chamber 39, the sterilization chamber 40, the post-conditioning chamber and the plurality of transition chambers 2, wherein the conveyor system 15 moves the container 18 in between the preconditioning chamber 39, the sterilization chamber 40, the post conditioning chamber and the plurality of transition chambers 2. As a result, the plurality of transition chambers 2 from the present invention alter its ambient condition to accommodate to the contiguous chamber condition, cycling between each of its adjacent operation chamber condition. Specifically, the plurality of transition chambers 2 acts as conditioning chambers that prepare the container 18 to be transferred into the subsequent chamber 17. This conditioning operation enables each operation chamber 3 to maintain stable and repetitive sub-cycles. Thereby reducing energy loss and the time requirements for performing sanitization operations.

Additionally, the present invention comprises at least one operation mesh 11. The operation mesh 11 is a permeable layer which matches the geometrical profile of the plurality of operation ports 8. Furthermore, the plurality of operation ports 8 comprises at least one operation injection port 9 and at least one operation evacuation port 10. The operation injection port 9 functions as a direct input port for inlet of fluids and/or similar which are utilized during a sanitization cycle. Similarly, the operation evacuation port 10 functions as a direct output port for outlet of fluids and/or similar which are utilized during a sanitization cycle. The operation injection port 9 is positioned offset from the operation evacuation port 10 across an arbitrary operation chamber, wherein the arbitrary operation chamber is from the plurality of operation chambers 3. Consequently, the operation injection port 9 and the operation evacuation port 10 remain independent of each other and unaffected when in use. Additionally, the operation mesh 11 is mounted over the operation evacuation port 10. Thus, the operation mesh 11 allows for capturing and/or filtering of any materials that are undesired, such as small particles or fibers from clogging down-flow components.

Furthermore, the present invention comprises at least one transition mesh 7. The transition mesh 7 is a permeable layer which matches the geometrical profile of the plurality of transition ports 4. Furthermore, the plurality of transition ports 4 comprises at least one transition injection port 5 and at least one transition evacuation port 6. The transition injection port 5 functions as a direct input port for inlet of fluids and/or similar which are utilized during a sanitization cycle. Similarly, the transition evacuation port 6 functions as a direct output port for outlet of fluids and/or similar which are utilized during a sanitization cycle. The transition injection port 5 is positioned offset from the transition evacuation port 6 across an arbitrary transition chamber, wherein the arbitrary transition chamber is from the plurality of transition chambers 2. Consequently, the transition injection port 5 and the transition evacuation port 6 remain independent of each other when in use. Additionally, the transition mesh 7 is mounted over the transition evacuation port 6. Thus, the transition mesh 7 allows for capturing and/or filtering of any materials that are undesired such as small particles or fibers from clogging down-flow components.

Furthermore, the preferred embodiment of the present invention comprises a plurality of transition instrumentation systems 13. The plurality of transition instrumentation systems 13 is composed of sensors selected from the group comprising temperature sensors, pressure sensors, chemical sensors, biological material sensors, and moisture sensors, among others. Additionally, each of the plurality of transition instrumentation systems 13 is integrated into a corresponding transition chamber 42, wherein the corresponding transition chamber 42 is from the plurality of transition chambers 2. As a result, data measurements and monitoring are feasible during operation. Specifically, the plurality of transition instrumentation systems 13 monitors the state of the environment within each transition chamber and provides feedback to a control system that is able to modify the conditions within the transition chamber to optimize sanitization operations.

Similarly, the preferred embodiment of the present invention comprises a plurality of operation instrumentation systems 12. The plurality of operation instrumentation systems 12 is composed of sensors selected from the group comprising temperature sensors, pressure sensors, chemical sensors, biological material sensors, and moisture sensors, among others. Additionally, each of the plurality of operation instrumentation systems 12 is integrated into a corresponding operation chamber 43, wherein the corresponding operation chamber 43 is from the plurality of operation chambers 3. As a result, data measurements and monitoring are feasible during operation. Specifically, the plurality of operation instrumentation systems 12 monitors the state of the environment within each operation chamber and provides feedback to a control system that is able to modify the conditions within the operation chamber to optimize sanitization operations.

Additionally, the preferred embodiment for the present invention further comprises a plurality of insulating liners 14. The insulating liners 14 from the plurality of insulating liners 14 are a structural layer that may be present inside or outside of each of the plurality of transition chambers 2 and each of the plurality of operation chambers 3. The insulating liners 14 provide thermal insulation for the plurality of transition chambers 2 and each of the plurality of operation chambers 3. The insulating liners 14 may comprise any geometrical profile which fulfills manufacturing, design and or user requirements. As previously mentioned, each of the plurality of transition chambers 2 and each of the plurality of operation chambers 3 is enveloped by a corresponding liner from the plurality of insulating liners 14. Consequently, temperature isolation is maintained for each of the plurality of transition chambers 2 and each of the plurality of operation chambers 3. In some embodiments, the insulating liners 14 are superimposed onto all pipes, tubes and other fluid transportation components, as well as instrumentation ports or similar connections in contact with, or adjacent to, the chambers Furthermore, the container 18 from the preferred embodiment of the present invention comprises a first endcap 23, a second endcap 44, an access door 19, at least one permeable sidewall 20, at least one first gasket 21, and at least one second gasket 22. The endcap comprises a geometrical profile of a solid plate and is manufactured from any feasible material which may safely withhold the operation working conditions. Preferably, the end caps comprise a thermal insulating material in between two solid plates forming the end cap, keeping the thermal insulation between chambers. In some embodiments the access door 19 is detachable from the container 18, meaning it allows for input and output of elements in the container 18. The permeable sidewall 20 is a mesh-like structure which comprises a cylindrical geometrical profile, but not limited to this geometry. The permeable sidewall 20 is also manufactured from any material which may withstand the operation working conditions. Additionally, the access door 19 is integrated into the container 18, thereby enabling the user to open the container 18 and remove any objects stored therein. The first gasket 21 and the second gasket 22 are ring-like structures which provide a seal between the container 18 and an arbitrary transition chamber. The first gasket 21 and the second gasket 22 are manufactured of any material which may withstand the operation working conditions, but is also a non-rigid body. The first endcap 23 and the second endcap 44 for the present invention are connected and adjacent to opposite ends of the permeable sidewall 20. Specifically, the first endcap 23 is terminally connected to the permeable sidewall 20 and the second endcap 44 is terminally connected to the permeable sidewall 20, opposite to the first endcap 23. In some embodiments, the access door 19 is integrated into the permeable sidewall 20 and can be attached or detached by any means, such as threaded, hinge and fixing pin, sliding, among others. Accordingly, the user is assured that contaminated items placed into the container 18 are not lost within the plurality of operation chambers 3 or the plurality of transition chambers 2. Furthermore, the first gasket 21 is connected around the first endcap 23. Similarly, the second gasket 22 is connected around the second endcap 44. As a result, the first gasket 21 and the second gasket 22 are pressed against the walls of the plurality of transition chambers 2 as the container 18 is moved between operation chambers 3. Thereby, forming a hermetic seal which prevents the conditions within an arbitrary operation chamber from bleeding into an adjacent operation chamber. Additionally, the contents of the container 18 are securely transported throughout the sanitization cycle. Furthermore, the permeable sidewall 20 of the container 18 allow for the contents of the container 18 to be in direct contact with the conditions of each of the plurality of transition chambers 2 and each of the plurality of operation chambers 3.

An alternative of the preferred embodiment of the present invention further comprises a plurality of hatches 24. The hatches from the plurality of hatches 24 are composed from at least one of the following group consisting of lateral sliding doors, vertical sliding doors, hydraulic sliding doors, pneumatic sliding doors, electric sliding doors, but not limited to such. The hatches allow for isolation between each of the plurality of transition chambers 2 and each of the plurality of operation chambers 3, performing the function of the container 18 endcaps and seals for the previous alternative. A preceding hatch 25 is integrated into the connection between the preceding chamber 16 and an arbitrary operation chamber, wherein the arbitrary operation chamber is from the plurality of operation chambers 3, and wherein the preceding hatch 25 is from the plurality of hatches 24. As a result, the preceding hatch 25 acts as a barrier for the exchange of fluids and physicochemical conditions between the preceding chamber 16 and the arbitrary operation chamber. Similarly, a subsequent hatch 26 is integrated into the connection between the subsequent chamber 17 and the arbitrary operation chamber, wherein the subsequent hatch 26 is from the plurality of hatches 24. Consequently, the subsequent hatch 26 acts as a barrier for the exchange of fluids and physicochemical conditions between the subsequent chamber 17 and the arbitrary operation chamber.

Furthermore, the preferred embodiment of the present invention further comprises a plurality of hatch gaskets 27 and a plurality of thermal hatch liners 28. The hatch gaskets from the plurality of hatch gaskets 27 are sealing malleable components which match the geometrical profile of the hatch from the plurality of hatches 24 and provide a hermetic seal between the gasket and an arbitrary transition chamber or an arbitrary operation chamber. Each of the plurality of hatch gaskets 27 is integrated around a corresponding hatch. Thus, the hatch gasket hermetically seals an opening of the corresponding hatch. The thermal hatch liners 28 provide thermal insulation similar to the plurality insulating liners 14 found in each of the plurality of operation chambers 3 and each of the plurality of transition chambers 2. Additionally, each of the plurality of thermal hatch liners 28 is housed within into a corresponding hatch. Specifically, each of the plurality of thermal hatch liners 28 is incorporated within the solid exterior surfaces of the hatch which are exposed to the interior of the plurality of transition chambers 2 and plurality of operation chambers 3. As a result, thermal isolation is achieved between each of the plurality of transition chambers 2 and each of the plurality of operation chambers 3. Further, the thermal hatch liners 28 are protected from exposure to the fluids and chemicals required to perform sanitizing operations. Additionally, the hatches from the plurality of hatches 24 comprise a safety locking mechanism. This safety locking mechanism prevents the plurality of hatches 24 from opening while hazardous conditions exist within the plurality of operation chambers 3 and the plurality of transition chambers 2.

Some embodiments further comprises a plurality of linear actuators 29. The linear actuator from the plurality of actuators is at least one selected from the group comprising pneumatic actuators, and hydraulic actuators. Each of the plurality of linear actuators 29 is integrated into a sidewall of a corresponding transition chamber 42, wherein the corresponding transition chamber 42 is from the plurality of transition chambers 2. Therefore, the linear actuator aids in overcoming differential pressure experienced by the container 18 when entering an arbitrary transition chamber from a preceding operation chamber, and when entering an arbitrary operation chamber from a preceding transition chamber. Furthermore, the container 18 is operatively coupled to the linear actuator of the corresponding transition chamber 42, thus, as previously mentioned the linear actuator provides sufficient force to overcome a pressure differential between the preceding chamber 16 operation chamber and the arbitrary adjacent operation chamber from the plurality of operation chambers 3. In this case, the linear actuators 29 may be into any plausible configuration which may overcome a pressure differential. Therefore, a possible arrangement is a plurality of hydraulic actuators which activate when the container 18 needs to traverse an arbitrary transition chamber. Then, the hydraulic actuators come in contact with the container 18 and push it through the arbitrary transition chamber.

Furthermore, the conveyor system 15 for the present invention comprises a loading portion 30, an unloading portion 31, a processing portion 32, and a feedback portion 33. The loading portion 30 is the starting point of the conveyor system 15 where the containers 18 are placed before a sanitization cycle. The unloading portion 31 is the ending point of the conveyor system 15 where the containers 18 are unloaded after a sanitization cycle. The processing portion 32 is the portion of the conveyor system 15 which extends from a first transition chamber to a last transition chamber. Therefore, the processing portion 32 traverses through the arrangement of each of the plurality of operation chambers 3 and each of the plurality of transition chambers 2. The feedback portion 33 is the portion of the conveyor system 15 which is after the unloading portion 31 and before the loading portion 30. The feedback portion 33 of the conveyor system 15 displaces the containers 18 back to the starting point, thus resulting in a closed-loop arrangement. The loading portion 30 is positioned adjacent to a first preceding chamber 34, wherein the first preceding chamber 34 is from the plurality of transition chambers 2. As a result, once the container 18 is placed on the loading portion 30, the container 18 securely travels and enters the first preceding chamber 34. The unloading portion 31 is positioned adjacent to a last subsequent chamber 35, wherein the last subsequent chamber 35 is from the plurality of transition chambers 2. Consequently, once the container 18 exits the last subsequent chamber 35, the container 18 securely travels and enters the unloading portion 31. The processing portion 32 is connected in between the loading portion 30 and the unloading portion 31. Thus, the processing portion 32 securely displaces the container 18 from the beginning of the sanitization cycle to the end of the sanitization cycle. The processing portion 32 traverses through the plurality of transition chambers 2 and the plurality of operation chambers 3. As a result, the processing portion 32 aids in maintaining the container 18 within each of the plurality of transition chambers 2 and each of the plurality of operation chambers 3. The feedback portion 33 is connected in between the loading portion 30 and the unloading portion 31. Consequently, the feedback portion 33 aids in displacing the container 18 back to the starting point of the sanitization cycle. The feedback portion 33 is positioned offset from the processing portion 32, around the conveyor system 15. As a result, the conveyor system 15 allows for a modular configuration, where the sanitization system may be arranged in a variety of positions. Throughout every variation and possible arrangement of each of the plurality of transition chambers 2 and each of the plurality of operation chambers 3, the sanitization system maintains its continuous operation configuration.

Additionally, the preferred embodiment of the present invention further comprises a programmable controller 36 with a human machine interface (HMI). The HMI is a part of a control system which governs the operation of the present invention. For instance, the programmable controller 36 allows for activation of an arbitrary operation injection or evacuation port and/or an arbitrary transition injection or evacuation port, arbitrary conveyor, actuator, hatches, or other automation component. Also receives signal from various sensors and instrumentation. While, the HMI may provide an option for setting working parameters such as time, temperature, pressure, etc. that can be understood by a person operating the machine in terms of direct working parameters that result in the desired sanitization end result. Additionally, the controller acts based on the HMI introduced settings to obtain the required results by operating over the components under its control previously mentioned. Thus, the programmable controller 36 and HMI provides control and monitoring of the working parameters of an arbitrary operation chamber and/or transition chamber, being communicably coupled to the plurality of transition chambers 2, the conveyor system 15, and the plurality of operation chambers 3. As a result, the sanitization system is fully controllable and monitorable via the HMI. Additionally, data values and readings from the plurality of instrumentation systems are visible via the HMI. Various possible manual overrides and programmable automation are implemented into the HMI.

Although the invention has been explained in relation to its preferred embodiment, it is to be understood that many other possible modifications and variations can be made without departing from the spirit and scope of the invention as hereinafter claimed.

SUPPLEMENTAL DESCRIPTIONS

Existing Problems the Invention Resolves

Time of idle elements or medical devices; the actual systems are batch type and depending on the machine capacity, the elements to be processed need to stay in queue until there is enough elements that can be treated with the same cycle parameters and can complete the capacity of the chamber to be reasonably economic to go ahead with the process.

Faster turnaround; when reusing medical devices or instrumentation, e.g. healthcare application, elements can be processed immediately, and because each stage of the cycle is already in the right conditions for the process to occur, the elements can go through the cycle without the need to wait for the machine to adjust the chamber's conditions in-between.

Machine footprint and sterilization sector as a whole; the size of the machine in comparison with conventional machines in the market could be similar or somewhat bigger, but can achieve several times the productivity of the previously mentioned. The sterilization sector could use one of the proposed machines to replace several traditional machines, and because the shape of the machine can be adapted to the limitations of the room to be installed in, the sector can optimize their space usage.

Variability of the sterilization process based on load weight that could end in process failure. There are studies indicating the variability of the sterilization process based on the type and amount of load (weight and distribution). The results indicate a notorious increment in the required time and preconditioning. The invention reduces the impact of the abovementioned factor over the variability, thus its effectiveness on the cycle. The reason is that the addition of elements into the process being performed in anytime is small and easily overcome by the machine, also the chambers are more stable thanks to being design to maintain constant conditions in them while running, and in contrast with the traditional machines there isn't a possible impact in effectiveness attributable to distribution of the load in the chamber.

Energy and resources (e.g. water, chemicals, etc.); one of the main factors that are evaluated by users at the moment of selecting a sterilizer is the consume of resources that can make up to great costs and waste as well as their ecological impact. For example, a traditional autoclave needs to do the following with the total volume of the chamber: expel the air (vacuum), preheat, fill with steam, compensate for loose of water and heat in the form of condensation, eject the steam, reduce drained fluid temperature before reaching sewer (usually with chilled water), dry wet elements, and cool down the interior. All these steps consume an enormous amount of energy in the form of heat and mechanical work for vacuum pumps, and water in the form of steam, as coolant and usually to generate vacuum (water ring pump). The proposed design has to do the same, but since conditions in each chamber are maintained, the amount of changes, water and energy wasted are extremely low in comparison. The injected steam is only the necessary to adequate the incoming elements and compensate for loss of heat through chamber's walls. Vacuum is maintained and it is only required to expel the amount of air incorporated with the new load. Same thing with the cooling process, no remnant heat from the machine structure, only elements coming out of the previous stage. Also, the amount of drainage is reduced because there isn't a need to eject the steam, and the only steam and water wasted during process is from condensation and in the preconditioning stage with steam pulses.

Concise Description

System for the decontaminate and/or sterilizing, and/or physical treatment of elements and/or devices for the medical industry, such as Hospitals, Pharmaceutical, medical device, biotechnology, or research laboratories. But could also be applicable to the food, chemical industry, decontamination of biological waste, plastic, rubber and composite curing. And any other industry served requiring decontamination, and/or sterilization, and/or physical treatment. The system is demonstrated with a steam sterilizer or autoclave but is not limited to this type of method, could be used for example with Ethylene Oxide, Ozone, Hydrogen Peroxide, Formaldehyde (LTSF), or any other germicidal chemical or physical condition.

Complete Description

System comprised of a set of containers in which the elements to be processed are placed. The containers can be entered continuously into the system, and travel through a series of chambers where the needed stages to complete a cycle are executed following good practices established in the industry.

We are going to use as an example of application for the system a steam sterilizer (autoclave). The selected shape and dimensions of the machine is what we consider the simplest form to explain and to build, but the embodiment can be applied in diverse shapes, dimensions, and methods (e.g. Ethylene Oxide, Ozone, Hydrogen Peroxide, Formaldehyde (LTSF), etc.). The containers are baskets possibly made in a cylindrical shape (could be any shape) with perforated, meshed or permeable material, such as corrosion resistant metal, other material like plastic, fibers, etc.

Inside the containers the elements to be processed are deposited, and later the containers are placed in a conveyor that feeds the machine through a hatch into the Transition chamber #1 (TC #1). There are several transition chambers in the machine that work as a passthrough to equalize the conditions in-between chambers; avoiding their direct communication and interchange of fluids or temperature. Hatches can be sliding doors or any other mean for the purpose of opening and achieving tight closure of the chambers. The hatches are automated by means of rack and pinion drive, pneumatic/hydraulic piston, or other mechanism.

Conveyors are installed inside each section of the machine to transport the containers along the stages of the process. The following description is in regard to an example of an embodiment applied to a steam sterilizer Class B [Transition #1 (T #1), Preconditioning (PrC), Transition #2 (T #2), Sterilization (S), Transition #3 (T #3), Postconditioning (PtC), Transition #4 (T #4)]. Conveyors can be of any type (e.g. belt, cables/wires, rollers, chain, rack and pinion, pneumatic, etc.).

The Preconditioning chamber, Sterilization chamber, and Postconditioning chamber, can accommodate several containers in them, while the Transition chambers will receive one at a time (could be more depending on the specific design for the application). The chambers have a cylindrical shape like a pipe, but is not limited to this shape (could be parallelepiped or any other), and could be made of stainless steel, or any other adequate material to withstand the working conditions, and walls of adequate thickness. The chambers have connections to the required services for its functioning, such as steam, vacuum, drain, instrumentation and checking ports, and safety devices (e.g. rupture discs and pressure relief valves). The chambers and other surfaces including hatches, pipes, connections, instrumentation, and external surfaces reachable to operators are thermally insulated with the most adequate material, namely: mineral wool, rock wool, glass wool, ceramic coatings, carbon composites, silica fibers, vacuum or other. Pipes, connections, valves and sensors are part of the elements necessary for the functioning of the embodiment.

The system utilizes a controller such as a computer, PLC or microcontroller for the actuation of conveyors, hatches, valves, and vacuum pump(s) (for simplification, the example of machine used for the explanation of the embodiment, is considering that the steam, water, compressed air and any other service required is supplied from an external source. In case it is not, the controller will also need to command the steam generator, compressor or any other servicing source). In addition to the function of controlling the automation, the PLC will receive input signal from sensors and instrumentation in order to take logical decisions for the functions as well as safe processing. Some back-up controller and record keeping device can also be included, being these common industry requirements for safety or traceability reasons.

The elements are loaded into the containers and in turn, the containers are placed in the first conveyor forming a row. The conveyor commanded by the controller moves the containers while opening the first hatch, allowing the admission of one container into the TC #1, and the hatch is closed. Inside the TC #1 steam is injected through an injection port, while a drain port is controlled to expel the air from the chamber to be replaced with steam; once the air is considered evacuated, the drain valve is closed, thus the pressure in the chamber raised to approximately 1.5 bar(a), that matches the conditions in a certain point in time with the Preconditioning chamber. Note that the cycle temperatures and pressures that are indicated along this text are only for reference; well established cycles or other can be used. In general, it is set within the range of about 115° C. to 138° C. Some sterilization apparatuses can be set at about 142° C. with their corresponding pressures for saturated steam. The time condition varies depending on the temperature condition during the sterilization step. In general, it is set at about 3 minutes to 60 minutes. Some types of sterilization apparatuses can be set at about 100 minutes. The pressure in the chamber during the pre-vacuum step (Preconditioning) is generally set at about 0.03 bar(a) to 0.01 bar(a), and the same during the drying step (Postconditioning).

The Preconditioning chamber maintains a fluctuating cycle of pulses of injected steam pressurizing to 1.5 bar(a) and vacuum of 0.04 bar(a). At the mentioned moment, matching 1.5 bar(a), the second hatch between the TC #1 and the Preconditioning chamber opens as well as the third hatch between the Preconditioning chamber and the TC #2. The conveyors from the Transition chambers and the Preconditioning chamber run all the containers in them one position forward, introducing the container from TC #1 into Preconditioning chamber and from this last the final container in its chamber into the TC #2. The hatches are closed, and TC #2 increases its pressure with addition of more steam up to 3 bar(a) and 132° C., now the conditions in this chamber are equal to the Sterilization chamber, thus the fourth hatch can be opened, communicating TC #2 with the Sterilization chamber and conveying the container into the aforementioned chamber. The TC #3 matches the conditions of the Sterilization chamber as well, and the fifth hatch between Sterilization chamber and TC #3 opens at the same time as the fourth hatch, allowing the last container in the Sterilization chamber to move by means of the conveyor into the TC #3, as well as the rest of the containers in the Sterilization chamber to move one position.

The hatches close and the TC #3 is evacuated from the steam through a drain when the valve opens and connect the chamber with the vacuum pump. The evacuation continues until reaching 0.04 bar(a) equalizing with the conditions in the Postconditioning Chamber, in which point the sixth and seventh hatches opens communicating with the PtC. The conveyor moves the container from TC #3 into the PtC and all the containers in the PtC one step, including the last container of the PtC into the TC #4.

Before the seventh hatch was opened, the conditions in TC #4 were matching the once in the PtC; once it receives a new container and the chamber is concealed, air is allowed to ingress through a filter and income valve until TC #4 reaches atmospheric pressure. At this moment the last hatch of the machine in the output side of it (eighth hatch) can be opened and the conveyor transport the container outside the machine to a receiving section for operators to take the elements from the container. It has to be mentioned that the TC #1 performs a similar procedure as TC #4, once the container at 1.5 bar(a) was transfer to the PrC and the hatches closed, TC #1 steam is evacuated and replaced with filtered air matching atmospheric pressure.

Alternative Design 1

An alternative to the hatch system is the use of containers as explained, but with modified end caps. The caps are solid plates possibly made of stainless steel, but not limited to this material. Along their circumference an elastomeric seal, or other material, that withstand the working conditions and friction is installed. These containers are introduced and go through the stages in the machine in the same way as explained previously. The difference resides in the method of transfer from stage to stage, now without hatches isolating the chambers from each other, the containers themselves are making the closure or seal thanks to their caps. The transition chamber walls are design to make contact with the container's cap seal, avoiding the exchange of fluid and physical conditions between them. The other difference with the previously described method is the need to maintain in recirculation (loop) the containers no matter if they have elements in them or not, because the chambers must have all their internal capacity of containers to keep the process of sealing and opening the chambers along the cycle. To do the recirculation or loop of the containers, a conveyor outside the chambers is transferring the containers from the output of the machine (unloading zone) to the input (loading zone). Various options of configuration of the chambers serve as an example of flexibility of the design in the present invention.

Alternative Design 2

For this alternative, we are choosing to use in our preferred embodiment a parallelepiped shaped container because it allows more load capacity and is more suitable to accommodate industry standard containers. In the same manner as the alternative design 1, with two of their faces blind (solid), we are calling them caps, while the rest of the faces are made with a meshed material, such as stainless-steel mesh, or other suitable. The caps are solid plates possibly made of stainless steel, but not limited to this material. Along their perimeter an elastomeric seal, or other material, that withstand the working conditions and friction is installed. The edges of the container are rounded, giving them a more robust structure, cleanliness and better seal between the containers and the transition chamber walls where the containers will passthrough. Transition chambers are sized and shaped such that the containers can go through them with their seals making contact to the chamber's walls, producing the desired sealing effect.

This alternative also has to maintain a close loop of containers to keep the container transfer sequence with the appropriate isolation between chambers. To do the recirculation or loop of the containers, a conveyor outside the chambers is transferring the containers from the output of the machine (unloading zone) to the input (loading zone).

Preconditioning, sterilization and postconditioning chambers are sized to admit several containers in them. Containers are received and transferred with use of a conveyor, for our embodiment description we are describing a vertical chain magazine style (also known as vertical conveyor elevator. Transition chambers feeds through one port into its corresponding contiguous chamber (PrC/S/PtC), where the container is incorporated into a magazine conveyor.

The conveyor moves the containers in it controlled by a computer, PLC or microcontroller in a continues or stepping mode, until reaching the position of the exit port to the following Transition chamber. The time required to move the container from the entry point to the exit point is the necessary to complete the sub-cycle for that particular container. The length, speed and size of the conveyor and chambers needs to be designed and programmed based on the production flow (rhythm) necessary for the application. The magazine conveyor is a very effective way of loading several containers into a processing chamber, like PrC, S and PtC, while keeping a minimal footprint by use of the vertical space. Multidirectional displacement of the containers can be added if instead of capping only two of the six faces, four faces are solid plates with seals while the remaining two made with meshed material. With this design, the containers can move in four directions allowing more flexibility to transport the containers from chamber to chamber, thus the chambers can be organized in different arrangements, resulting in an optimization of space.

The other arrangement that can be done for the same purpose of obtaining multidirectional displacement and without adding the extra caps (explained before), is the addition of a rotational base to re-align the container cap's axis in the same orientation of the chamber to be introduced to. Process chambers and Transition chambers can be arranged and connected in different positions and shapes. This modular and flexible design of the arrangement of sequences add the advantage of allowing the interconnection of the chambers in such a way that parallel lines of processes can be achieved simultaneously, and/or different cycle conditions making the containers follow different paths, for example in the same machine could be arranged to process with cycles of saturated steam at 135° C. (flash sterilization), 121° C. (standard sterilization) as well as low temperature sterilization with other fluids and environment conditions (ETO, H2O2, O3, LTSF, etc.).

Additional Improvements

Electric resistances or other heat generation means inside the chamber(s) can be added to compensate for heat lost, and re-evaporate condensation, thus recycling and maintaining the amount of steam. These resistances are located at the end of a condensate gutter in the lower part of the chamber, and because the condensed steam only needs a small amount of heat to change back its state into saturated steam, this addition can improve the efficiency of the machine and reduce heat and water consumption. This system is viable without re-pressurization, for example, in the Sterilization chamber because of the hermetic and stable running condition of it at all times even when introducing or removing containers, these is true thanks to matching the container's condition before their transfer. And in case the pressure is reduced by some reason such as leaks, a small amount of additional steam can compensate for it.

Another efficiency improvement is the use of a steam recovery system, by collecting from T #1, PrC, T #3, and any other steam trap or separator. When extracted from the respective chamber with use of a vacuum pump or similar, it is directed into a steam recovery tank and re-pressurized with a steam compressor or pump; and re-heated with an electric resistance or other heat generation means to the necessary working conditions. This tank has also a connection with fresh steam from the steam generation source to compensate for losses and is from this tank where the main steam line of distribution to inject into the chambers is obtained. A second vacuum pump is included for the PtC and T #4, since there is no steam to recover, and the air from T #4 is an undesirable substance, the vacuumed fluid is expelled into the sewer or atmospheric vent.

What is claimed is:

1. A continuous element decontamination and sterilization system comprising:
    a plurality of transition chambers;
    a plurality of operation chambers;
    a plurality of transition ports;
    a plurality of operation ports;
    at least one conveyor system;
    at least one container;
    each of the plurality of operating chambers being connected in between a preceding chamber and a subsequent chamber, wherein the preceding chamber and the subsequent chamber are from the plurality of transition chambers;
    an arbitrary plurality of transition ports being integrated into each of the plurality of transition chambers, wherein the arbitrary plurality of transition ports is from the plurality of transition ports;
    an arbitrary plurality of operation ports being integrated into each of the plurality of operation chambers, wherein the arbitrary plurality of operation ports is from the plurality of operation ports; and
    the at least one conveyor system being operatively coupled between the plurality of operation chambers and the plurality of transition chambers, wherein the at least one conveyor system moves the at least one container in between the plurality of operating chambers and the plurality of transition chambers;
    a plurality of hatches;
    a plurality of hatch gaskets;
    a plurality of thermal hatch liners;
    each of the plurality of hatch gaskets being integrated around a corresponding hatch, wherein each of the plurality of hatch gaskets hermetically seals an opening of the corresponding hatch; and
    each of the plurality of thermal hatch liners being housed within the corresponding hatch.

2. The continuous element decontamination and sterilization system as claimed in claim 1 comprising:
    the plurality of operation chambers comprising at least one preconditioning chamber, at least one sterilization chamber, and at least one postconditioning chamber;
    the at least one preconditioning chamber, the at least one sterilization chamber, the at least one postconditioning chamber and the plurality of transition chambers being serially connected;
    the at least one sterilization chamber being positioned in between the at least one preconditioning chamber and the at least one postconditioning chamber; and
    the at least one conveyor system being operatively coupled between the at least one preconditioning chamber, the at least one sterilization chamber, the at least one postconditioning chamber and the plurality of transition chambers, wherein the at least one conveyor system moves the at least one container in between the at least one preconditioning chamber, the at least one sterilization chamber, the at least one postconditioning chamber and the plurality of transition chambers.

3. The continuous element decontamination and sterilization system as claimed in claim 1 comprising:

at least one operation mesh;
the plurality of operation ports comprising at least one operation injection port and at least one operation evacuation port;
the at least one operation injection port being positioned offset from the at least one operation evacuation port across an arbitrary operation chamber, wherein the arbitrary operation chamber is from the plurality of operation chambers; and
the at least one operation mesh being mounted over the at least one operation evacuation port.

4. The continuous element decontamination and sterilization system as claimed in claim 1 comprising:
at least one transition mesh;
the plurality of transition ports comprising at least one transition injection port and at least one transition evacuation port;
the at least one transition injection port being positioned offset from the at least one transition evacuation port across an arbitrary transition chamber, wherein the arbitrary transition chamber is from the plurality of transition chambers; and
the at least one transition mesh being mounted over the at least one transition evacuation port.

5. The continuous element decontamination and sterilization system as claimed in claim 1 comprising:
a plurality of transition instrumentation systems; and
each of the plurality of transition instrumentation systems being integrated into a corresponding transition chamber, wherein the corresponding transition chamber is from the plurality of transition chambers.

6. The continuous element decontamination and sterilization system as claimed in claim 1 comprising:
a plurality of operation instrumentation systems; and
each of the plurality of operation instrumentation systems being integrated into a corresponding operation chamber, wherein the corresponding operation chamber is from the plurality of operation chambers.

7. The continuous element decontamination and sterilization system as claimed in claim 1 comprising:
a plurality of insulating liners; and
each of the plurality of transition chambers and each of the plurality of operation chambers being enveloped by a corresponding liner from the plurality of insulating liners.

8. The continuous element decontamination and sterilization system as claimed in claim 1 comprising:
a preceding hatch being integrated into the connection between the preceding chamber and an arbitrary operation chamber, wherein the arbitrary operation chamber is from the plurality of operation chambers, and wherein the preceding hatch is from the plurality of hatches; and
a subsequent hatch being integrated into the connection between the subsequent chamber and the arbitrary operation chamber, wherein the subsequent hatch is from the plurality of hatches.

9. The continuous element decontamination and sterilization system as claimed in claim 1 comprising:
a plurality of linear actuators;
each of the plurality of linear actuators being integrated into a sidewall of a corresponding transition chamber, wherein the corresponding transition chamber is from the plurality of transition chambers; and
the at least one container being operatively coupled to the linear actuator of the corresponding transition chamber, wherein the linear actuator provides sufficient force to overcome a pressure differential between the preceding chamber and an adjacent operation chamber from the plurality of operation chambers.

10. The continuous element decontamination and sterilization system as claimed in claim 1 comprising:
the at least one conveyor system comprising a loading portion, an unloading portion, a processing portion, and a feedback portion;
the loading portion being positioned adjacent to a first preceding chamber, wherein the first preceding chamber is from the plurality of transition chambers;
the unloading portion being positioned adjacent to a last subsequent chamber, wherein the last subsequent chamber is from the plurality of transition chambers;
the processing portion being connected in between the loading portion and the unloading portion;
the processing portion traversing through the plurality of transition chambers and the plurality of operation chambers;
the feedback portion being connected in between the loading portion and the unloading portion; and
the feedback portion being positioned offset from the processing portion.

11. The continuous element decontamination and sterilization system as claimed in claim 1 comprising:
a programmable controller; and
the programmable controller being communicably coupled to the plurality of transition chambers, the at least one conveyor system, and the plurality of operation chambers.

12. A continuous element decontamination and sterilization system comprising:
a plurality of transition chambers;
a plurality of operation chambers;
a plurality of transition ports;
a plurality of operation ports;
at least one conveyor system;
at least one container;
a plurality of linear actuators;
each of the plurality of operating chambers being connected in between a preceding chamber and a subsequent chamber, wherein the preceding chamber and the subsequent chamber are from the plurality of transition chambers;
an arbitrary plurality of transition ports being integrated into each of the plurality of transition chambers, wherein the arbitrary plurality of transition ports is from the plurality of transition ports;
an arbitrary plurality of operation ports being integrated into each of the plurality of operation chambers, wherein the arbitrary plurality of operation ports is from the plurality of operation ports;
the at least one conveyor system being operatively coupled between the plurality of operation chambers and the plurality of transition chambers, wherein the at least one conveyor system moves the at least one container in between the plurality of operating chambers and the plurality of transition chambers;
each of the plurality of linear actuators being integrated into a sidewall of a corresponding transition chamber, wherein the corresponding transition chamber is from the plurality of transition chambers; and
the at least one container being operatively coupled to the linear actuator of the corresponding transition chamber, wherein the linear actuator provides sufficient force to overcome a pressure differential between the preceding chamber and an adjacent operation chamber from the plurality of operation chambers.

13. The continuous element decontamination and sterilization system as claimed in claim 12 comprising:
the plurality of operation chambers comprising at least one preconditioning chamber, at least one sterilization chamber, and at least one postconditioning chamber;
the at least one preconditioning chamber, the at least one sterilization chamber, the at least one postconditioning chamber, and the plurality of transition chambers being serially connected;
the at least one sterilization chamber being positioned in between the at least one preconditioning chamber and the at least one postconditioning chamber; and
the at least one conveyor system being operatively coupled between the at least one preconditioning chamber, the at least one sterilization chamber, the at least one postconditioning chamber, and the plurality of transition chambers, wherein the at least one conveyor system moves the at least one container in between the at least one preconditioning chamber, the at least one sterilization chamber, the at least one postconditioning chamber, and the plurality of transition chambers.

14. The continuous element decontamination and sterilization system as claimed in claim 12 comprising:
at least one operation mesh;
the plurality of operation ports comprising at least one operation injection port and at least one operation evacuation port;
the at least one operation injection port being positioned offset from the at least one operation evacuation port across an arbitrary operation chamber, wherein the arbitrary operation chamber is from the plurality of operation chambers; and
the at least one operation mesh being mounted over the at least one operation evacuation port.

15. The continuous element decontamination and sterilization system as claimed in claim 12 comprising:
at least one transition mesh;
the plurality of transition ports comprising at least one transition injection port and at least one transition evacuation port;
the at least one transition injection port being positioned offset from the at least one transition evacuation port across an arbitrary transition chamber, wherein the arbitrary transition chamber is from the plurality of transition chambers; and
the at least one transition mesh being mounted over the at least one transition evacuation port.

16. The continuous element decontamination and sterilization system as claimed in claim 12 comprising:
a plurality of transition instrumentation systems; and
each of the plurality of transition instrumentation systems being integrated into a corresponding transition chamber, wherein the corresponding transition chamber is from the plurality of transition chambers.

17. The continuous element decontamination and sterilization system as claimed in claim 12 comprising:
a plurality of operation instrumentation systems; and
each of the plurality of operation instrumentation systems being integrated into a corresponding operation chamber, wherein the corresponding operation chamber is from the plurality of operation chambers.

18. The continuous element decontamination and sterilization system as claimed in claim 12 comprising:
a plurality of insulating liners; and
each of the plurality of transition chambers and each of the plurality of operation chambers being enveloped by a corresponding liner from the plurality of insulating liners.

19. The continuous element decontamination and sterilization system as claimed in claim 12 comprising:
an access door;
the at least one container comprising a first endcap, a second endcap, a permeable sidewall, a first gasket, and a second gasket;
the first endcap being connected adjacent to a first end of the permeable sidewall;
the second endcap being connected adjacent to a second end of the permeable sidewall, opposite to the first endcap across the permeable sidewall;
the first gasket being connected around the first endcap;
the second gasket being connected around the second endcap; and
the access door being integrated into the at least one container.

20. The continuous element decontamination and sterilization system as claimed in claim 12 comprising:
a plurality of hatches;
a preceding hatch being integrated into the connection between the preceding chamber and an arbitrary operation chamber, wherein the arbitrary operation chamber is from the plurality of operation chambers, and wherein the preceding hatch is from the plurality of hatches; and
a subsequent hatch being integrated into the connection between the subsequent chamber and the arbitrary operation chamber, wherein the subsequent hatch is from the plurality of hatches.

21. The continuous element decontamination and sterilization system as claimed in claim 20 comprising:
a plurality of hatch gaskets;
a plurality of thermal hatch liners;
each of the plurality of hatch gaskets being integrated around a corresponding hatch, wherein each of the plurality of hatch gaskets hermetically seals an opening of the corresponding hatch; and
each of the plurality of thermal hatch liners being housed within the corresponding hatch.

22. The continuous element decontamination and sterilization system as claimed in claim 12 comprising:
the at least one conveyor system comprising a loading portion, an unloading portion, a processing portion, and a feedback portion;
the loading portion being positioned adjacent to a first preceding chamber, wherein the first preceding chamber is from the plurality of transition chambers;
the unloading portion being positioned adjacent to a last subsequent chamber, wherein the last subsequent chamber is from the plurality of transition chambers;
the processing portion being connected in between the loading portion and the unloading portion;
the processing portion traversing through the plurality of transition chambers and the plurality of operation chambers;
the feedback portion being connected in between the loading portion and the unloading portion; and
the feedback portion being positioned offset from the processing portion.

23. The continuous element decontamination and sterilization system as claimed in claim 12 comprising:

a programmable controller; and the programmable controller being communicably coupled to the plurality of transition chambers, the at least one conveyor system, and the plurality of operation chambers.

\* \* \* \* \*